US008540206B2

(12) United States Patent
Foshansky et al.

(10) Patent No.: US 8,540,206 B2
(45) Date of Patent: Sep. 24, 2013

(54) MULTI-STABLE ACTUATION APPARATUS AND METHODS FOR MAKING AND USING THE SAME

(75) Inventors: Leonid Foshansky, San Diego, CA (US); Robert Bogursky, Encinitas, CA (US)

(73) Assignee: Autosplice, Inc., San Diego, CA (US)

( * ) Notice: Subject to any disclaimer, the term of this patent is extended or adjusted under 35 U.S.C. 154(b) by 609 days.

(21) Appl. No.: 12/539,521

(22) Filed: Aug. 11, 2009

(65) Prior Publication Data

US 2010/0108922 A1    May 6, 2010

Related U.S. Application Data

(60) Provisional application No. 61/189,148, filed on Aug. 14, 2008, provisional application No. 61/206,883, filed on Feb. 4, 2009.

(51) Int. Cl.
*F16K 31/00* (2006.01)
(52) U.S. Cl.
USPC .............................. 251/11; 60/527
(58) Field of Classification Search
USPC ...................... 251/11; 60/527–528
See application file for complete search history.

(56) References Cited

U.S. PATENT DOCUMENTS

| 4,448,147 A | 5/1984 | Dewaegheneire |
| 4,484,725 A * | 11/1984 | Yoshiga ........................... 251/11 |
| 4,806,815 A * | 2/1989 | Honma ........................... 310/307 |
| 5,020,601 A | 6/1991 | Retzloff et al. |
| 5,259,554 A | 11/1993 | Ewing et al. |
| 5,397,053 A | 3/1995 | Ewing et al. |
| 6,840,257 B2 | 1/2005 | Dario et al. |
| 6,843,465 B1 | 1/2005 | Scott |
| 6,959,904 B2 | 11/2005 | Beraldo |
| 7,055,793 B2 | 6/2006 | Biehl et al. |
| 7,331,563 B2 | 2/2008 | Biehl et al. |
| 7,347,221 B2 | 3/2008 | Berger et al. |
| 2002/0171055 A1 * | 11/2002 | Johnson et al. ................. 251/11 |
| 2005/0005980 A1 | 1/2005 | Eberhardt et al. |
| 2005/0172462 A1 | 8/2005 | Rudduck et al. |
| 2006/0091342 A1 | 5/2006 | Butera et al. |
| 2007/0114968 A1 * | 5/2007 | Krah et al. ..................... 320/103 |
| 2007/0294873 A1 | 12/2007 | Bogursky |

* cited by examiner

*Primary Examiner* — Eric Keasel
*Assistant Examiner* — David Colon Morales
(74) *Attorney, Agent, or Firm* — Gazdzinski & Associates, PC

(57) ABSTRACT

Actuator apparatus having a multi-stable element actuated by memory alloy actuating elements. In one embodiment, the multi-stable actuator comprises a bistable (two-state) diaphragm element adapted to alternate between two stable configurations via forces exerted on the diaphragm by more than one memory alloy filaments in response to thermal activation. In another embodiment, the bistable diaphragm of the multi-stable actuator transitions from a first to a second stable configuration via forces exerted by a single filament in response to direct or indirect thermal activation. A portion of the assembly is displaced when the assembly is in the second configuration. The bistable diaphragm transitions back to the first stable configuration via application of mechanical force on a portion of the assembly which was displaced. Methods for making and using the bistable actuator apparatus are also disclosed.

10 Claims, 21 Drawing Sheets

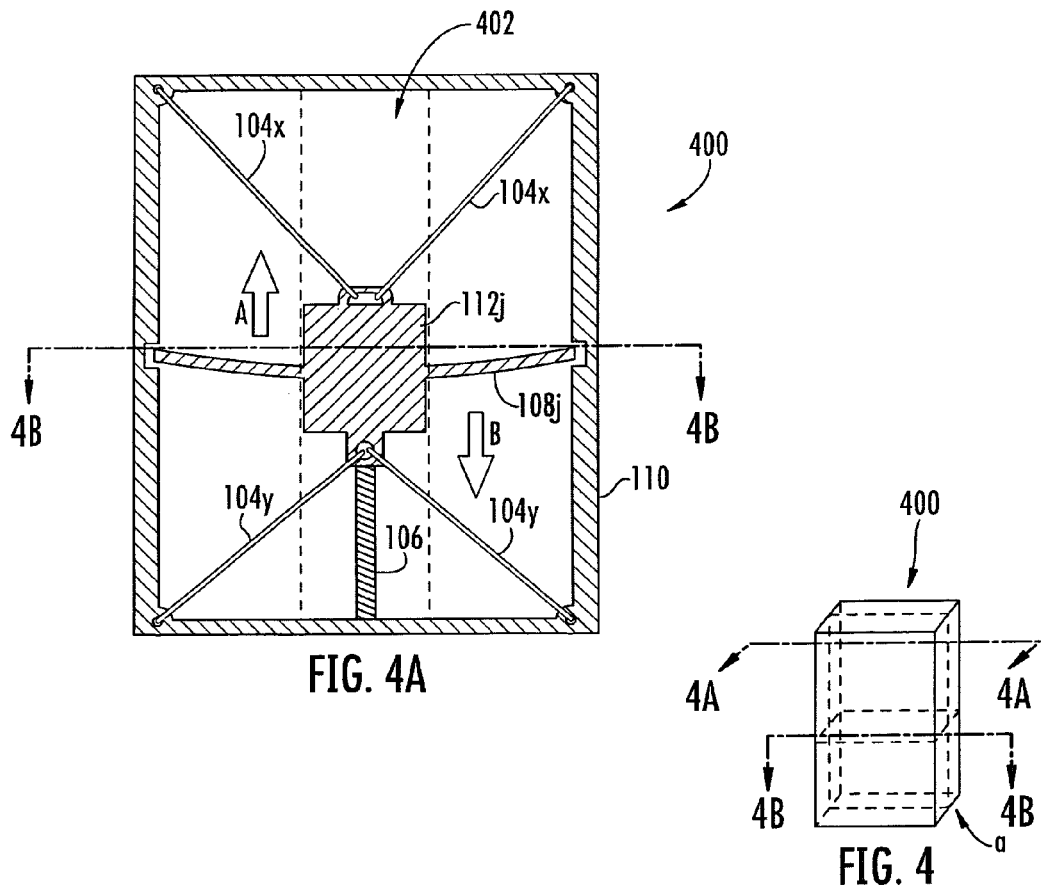
FIG. 4A
FIG. 4
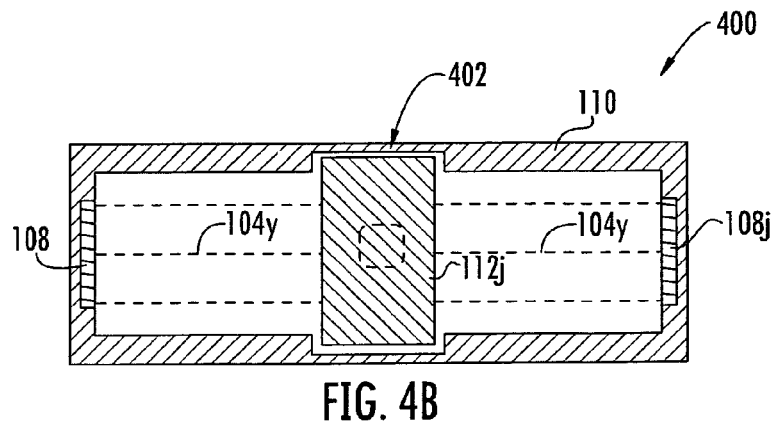
FIG. 4B

MULTI-STABLE ACTUATION APPARATUS AND METHODS FOR MAKING AND USING THE SAME

PRIORITY APPLICATIONS

This application claims priority to co-owned U.S. provisional patent application Ser. No. 61/189,148 filed Aug. 14, 2008 of the same title; as well as and co-owned U.S. Provisional Patent Application Ser. No. 61/206,883 filed Feb. 4, 2009 entitled "Memory Alloy-Actuated Apparatus and Methods for Making and Using the Same", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. FIELD OF THE INVENTION

The present invention relates generally to the area of sensors, actuators and switches, and more specifically in one exemplary aspect, to an improved design for and methods of manufacturing and using an actuator or sensor apparatus which is actuated by a shape memory alloy (SMA) material.

2. DESCRIPTION OF RELATED TECHNOLOGY

Actuator assemblies are well known in a variety of industries, including such common applications such as wastewater treatment plants, power plants, manufacturing plants and refineries, as well as in certain consumer devices. One common prior art apparatus for actuator-induced movement is a solenoid. A solenoid is a device that converts energy (e.g. electrical current, fluid pressure, etc.) into a linear actuation. An electromechanical solenoid typically comprises electrically conductive windings that are wrapped around a magnetic core. The windings produce a magnetic field when an electrical current is passed through it, thereby inducing the magnetic core to move. A pilot valve stem or other such parent apparatus is coupled to the magnet, thereby actuating a parent device. Other types of "solenoids" also exist, such as pneumatic or even hydraulic solenoids. One exemplary application for solenoids is via the integrated use of a solenoid to actuate a valve. These include anything from large, high pressure systems to smaller home or vehicle systems, including e.g., automatic flush toilets.

Numerous examples of solenoid actuators exist in the prior art including, for example, U.S. Pat. No. 7,347,221 to Berger, et al. issued Mar. 25, 2008 and entitled "SOLENOID VALVE".

A common limitation with regards to electromechanical solenoids (particularly those that are used in small or portable consumer applications such as the aforementioned automatic flush toilets) is the fact that the actuating current is often generated via a series of batteries. Such batteries are often arranged in a series configuration, thereby adding the voltage of each cell while maintaining a common current through each. These solenoid actuators generally have comparatively large power requirements, and are often inefficient due to inter alia the internal resistance associated with the application of an electric current across the solenoid coils.

Furthermore, the reliability of prior art solenoid actuators is dependent upon each of the batteries in the aforementioned "series" power source delivering constant power; if any one of the batteries falters, the solenoid actuator cannot function since the current path is broken (i.e., the "dead" cell will not conduct).

In addition to solenoids, actuators can be coupled to so-called multi-stability mechanisms in order to assist with actuator assembly applications such as valves. Multi-stability refers to the ability of an object to exist in multiple (e.g., two or more) stable states. Little or no energy is required to maintain an object in any one of the two stable states of a bistable object. However, activation energy is required for the object to switch between the two given stable states.

Bistable mechanisms have been utilized for various functions in the prior art, including valves. Examples of bistable mechanisms are disclosed at, for example, U.S. Pat. No. 6,959,904 to Beraldo issued Nov. 1, 2005 and entitled "Solenoid valve device of the bistable type, particularly for controlling the supply of water to a washing machine"; and U.S. Pat. No. 7,331,563 to Biehl, et al. issued Feb. 19, 2008 and entitled "Valve with compact actuating mechanism".

Shaped Memory Alloy

Similarly, the use of shaped memory alloy (SMA) for various purposes including device actuation is also well known. SMA generally comprises a metal that is capable of "remembering" or substantially reassuming a previous geometry or physical condition. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

SMAs often find particular utility in a variety of mechanical systems including, for example, U.S. Pat. No. 6,840,257 to Dario, et al. issued Jan. 11, 2005 and entitled "Proportional valve with shape memory alloy actuator"; U.S. Pat. No. 6,843,465 to Scott, issued Jan. 18, 2005 and entitled "Memory wire actuated control valve"; U.S. Pat. No. 7,055,793 to Biehl, et al., issued Jun. 6, 2006 and entitled "Valve with compact actuating mechanism"; and United States Patent Publication No. 20050005980, to Eberhardt, et al. published Jan. 13, 2005 and entitled "Multiway valve".

Despite the foregoing wide variety of actuation approaches and configurations in the prior art, there remains an unsatisfied need for improved actuator apparatus that: (i) utilizes a more reliable power source than a typical "series" battery arrangement, (ii) reduces overall power requirements for operation, (iii) reduces power necessary for linear movement initiated by the actuator, and (iv) reduces internal resistance and Ohmic power losses.

In another aspect, an improved thermal sensor device is needed which reduces overall power requirements for operation (and for linear movement of the sensor), and which provides visual or other indication of its actuation.

SUMMARY OF THE INVENTION

The invention satisfies the aforementioned needs by providing improved actuator or sensor apparatus which is actuated by a shape memory alloy (SMA) material.

In a first aspect of the invention, exemplary actuator apparatus is disclosed. In one embodiment, the actuator comprises a diaphragm element comprising a plurality of stable configurations, a diaphragm biasing element coupled to at least a portion of the diaphragm element and at least one alloy filament coupled to the diaphragm biasing element and comprising a first and second states. The apparatus further is adapted to, upon the application of energy to the at least one alloy cause the filament to assume change shape (e.g., contract), thereby causing the diaphragm element to switch from a first of the stable configurations to a second of the stable configurations.

In another embodiment, the actuator, comprises: a diaphragm element, the diaphragm element comprising two substantially stable configurations; and at least first and second alloy filaments adapted to exert force on first and second sides of the diaphragm, respectively. The first and second filaments are arranged to alternatively be placed under tension or relaxed when the diaphragm changes state from a first of the configurations to a second of the configurations.

In a second aspect of the invention, methods of manufacturing the aforementioned actuator apparatus is disclosed.

In a third aspect of the invention, methods of using the aforementioned actuator apparatus is disclosed. In one exemplary embodiment, this includes methods of using the aforementioned actuator apparatus as a pilot valve; i.e., to control a larger or parent valve.

In another embodiment, the method comprises applying energy to a diaphragm element, the diaphragm element comprising two substantially stable configurations, the application of energy causing the diaphragm element to switch from a first stable state to a second stable state. The diaphragm element will remain in the second stable state subsequent to the act of applying energy once the application of the energy has stopped.

In a fourth aspect of the invention, a bistable assembly is disclosed. In one embodiment, the bistable assembly comprises a mechanical bistable with central shaft, and two opposing SMA filaments which act upon opposite sides of the shaft so as to change the bistable from one stable state to the other. The filaments are adapted to utilize electrical current for activation; when one (tensioned) filament is energized, the bistable is pulled into the second stable state, which then tensions the other filament thereby preparing it for energization and state change of the bistable back to its original state.

In a fifth aspect of the invention, business methods associated with the aforementioned actuator apparatus is disclosed. In one exemplary embodiment, the business method comprises selling the bistable SMA actuator apparatus as a replacement part, thereby reducing energy usage in extant valve installations.

In a sixth aspect of the invention, a more power-efficient actuator is disclosed. In one embodiment, the actuator comprises SMA filaments that are operated by a parallel-arranged battery power source. Use of this parallel arrangement in conjunction with the SMA filaments provides a highly power-efficient actuator which uses several times less power than a corresponding prior art solenoid arrangement. This arrangement is also more reliable than prior art series-cell arrangements, since one (or more) cell failures will not prevent the actuator from operating.

In another embodiment, the power-efficient actuator comprises: a diaphragm element, the diaphragm element comprising two substantially stable configurations; at least a first alloy filament adapted to exert force on at least a first side of the diaphragm; and a power source in electrical communication with the at least first filament, the power source comprising a plurality of energy cells disposed substantially in electrical parallel with one another. The at least first filament is arranged to be placed under tension when current from the power source is passed therethough, and the actuator can be actuated by the at least first filament using the power source even when a majority of the cells fail or are rendered inoperative.

In a seventh aspect, a more cost effective and ecologically friendly ("green") battery-powered actuator is disclosed. In one embodiment, the actuator utilizes a parallel battery arrangement which will operate even with one or more failed batteries. Especially when used in conjunction the power-efficient actuator referenced above, this parallel arrangement necessitates fewer battery replacements during the same period of time, thereby reducing operating costs and producing less ecologically damaging waste.

In an eighth aspect of the invention, a memory alloy actuated device is disclosed. In one embodiment, the device comprises a diaphragm element comprising two substantially stable configurations, a shaft adapted to be displaced when the diaphragm element changes state from a first configuration to a second configuration, and a memory alloy filament adapted to exert force on the diaphragm, the force causing the diaphragm element to change state from the first to the second configuration. Mechanical reloading of the shaft is required to cause the diaphragm to change state from the second to the first configuration. In one variant, the filament is adapted to be placed under tension or relaxed when the diaphragm changes state from the first to the second configurations.

In a ninth aspect of the invention, a thermal sensor/indicator is disclosed. In one embodiment, the thermal sensor/indicator comprises a mechanical bistable element with central shaft, and a temperature sensitive filament which acts upon the shaft so as to change the bistable from a first stable state to a second stable state. The temperature sensitive filament is activated when the environment of the thermal sensor/indicator reaches a predetermined temperature. In one variant, determination of the predetermined temperature is based at least in part on one or more properties of the filament including, inter alia, the thickness of the filament, the number of strands the filament is composed of, the length of the filament, and the latency associated with responding to environmental (e.g., temperature) changes.

BRIEF DESCRIPTION OF THE DRAWINGS

The features, objectives, and advantages of the invention will become more apparent from the detailed description set forth below when taken in conjunction with the drawings, wherein:

FIG. 4 illustrates a side perspective view of a third exemplary actuator assembly manufactured in accordance with the principles of the present invention.

FIG. 4A illustrates a cross-sectional view of the exemplary actuator assembly of FIG. 4 taken along line 4A-4A.

FIG. 4B illustrates a cross-sectional view of the exemplary actuator assembly of FIG. 4A taken along the line 4B-4B.

DETAILED DESCRIPTION OF THE INVENTION

Figure 1:
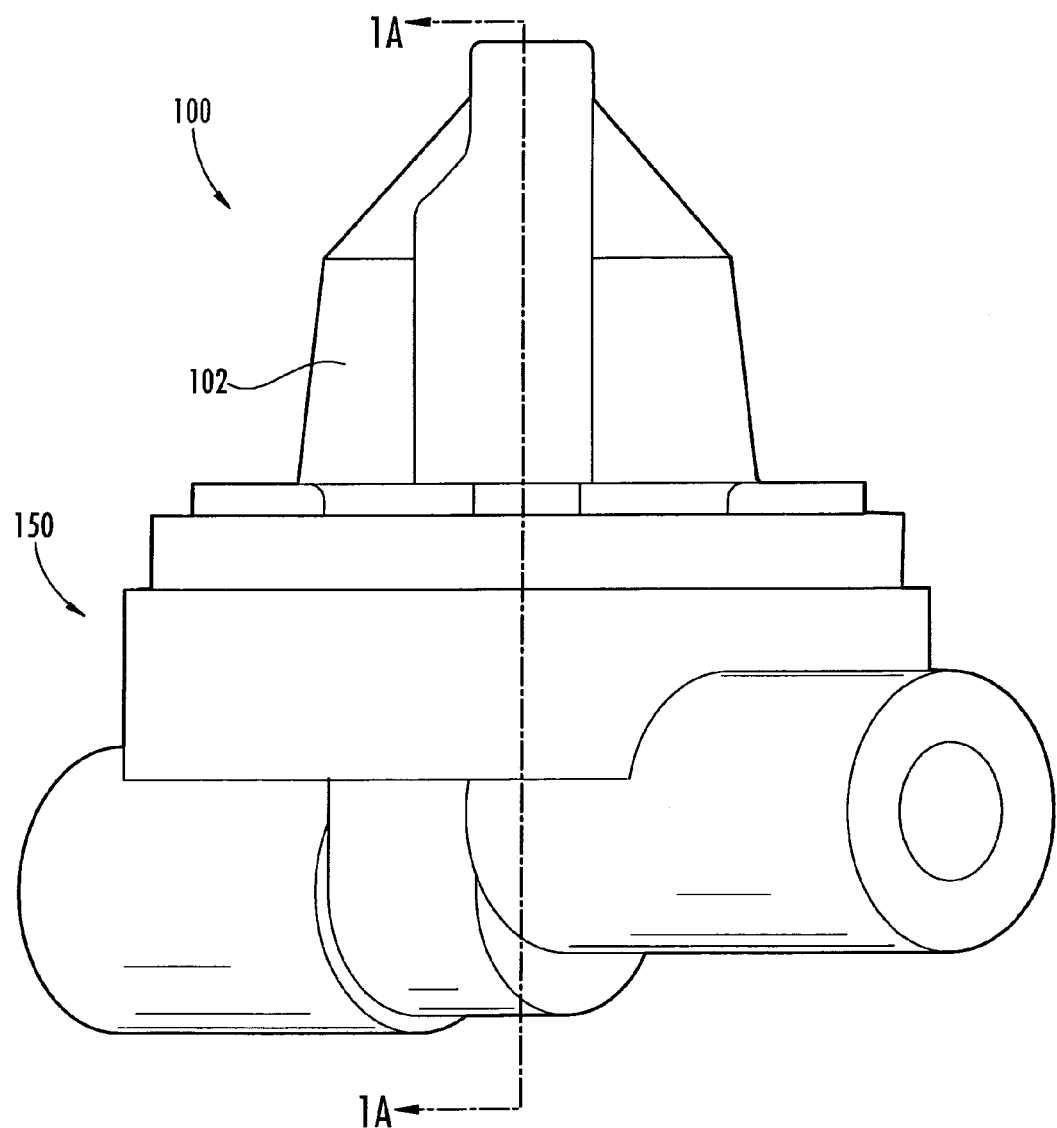
FIG. 1 illustrates a perspective view of an exemplary actuator assembly manufactured in accordance with the principles of the present invention.

Reference is now made to the drawings wherein like numerals refer to like parts throughout.

As used herein, the terms "electrical component" and "electronic component" are used interchangeably and refer to components adapted to provide some electrical or electronic function, including without limitation, fuses, transformers, filters, inductors, capacitors, resistors, operational amplifiers, transistors and diodes, whether discrete components or integrated circuits, whether alone or in combination. In addition, other ancillary electronic devices such as for example, so-called EMI shields and the like, which could be considered passive in nature, are considered encompassed as possibilities within the meaning of this term.

As used herein, the term "filament" refers to any substantially elongate body, form, strand, or collection of the foregoing, including without limitation drawn, extruded or stranded wires or fibers, whether metallic or otherwise.

As used herein, the term "shape memory alloy" or "SMA" shall be understood to include, but not be limited to, any metal that is capable of "remembering" or substantially reassuming a previous geometry. For example, after it is deformed, it can either substantially regain its original geometry by itself during e.g., heating (i.e., the "one-way effect") or, at higher ambient temperatures, simply during unloading (so-called "pseudo-elasticity"). Some examples of shape memory alloys include nickel-titanium ("NiTi" or "Nitinol") alloys and copper-zinc-aluminum alloys.

Overview

In one aspect of the invention, improved actuator assembly apparatus is disclosed. In one exemplary embodiment, the actuator assembly comprises a bistable diaphragm element, at least one alloy filament, and a biasing element. The biasing element is used to apply a force on the bistable diaphragm which has at least two stable configurations. The application of force causes the diaphragm to alternate between the two stable configurations.

The biasing element exerts forces on the diaphragm via its connection to the alloy filament(s) which change shape in response to thermal activation. Movement of the diaphragm causes movement in a controller portion associated with a valve. Utilization of SMA filaments and their placement geometries within the assembly are designed so as to be highly efficient, thus using less power than other mechanisms for causing movement of the controller portion. The actuator assembly may be used as to control switched valves, pilot valves, oxygen valves, and/or temperature-induced shut-off valves.

Thermal activation of the alloy filaments of the present invention is also enhanced such that activation may be the result of a current applied to filaments via one or more batteries in parallel. This configuration of batteries has the advantage of providing power more reliably than batteries held in series as well as reducing the overall power requirements of the thermal activation and reducing internal resistance and Ohmic power losses.

In another aspect, an improved thermal sensing and/or indicating device is disclosed. In one embodiment, this device comprises a bistable diaphragm and is actuated by a memory alloy (e.g., SMA) wire or filament, the latter which may be heated electrically or by way of conduction, convection and/or radiation from ambient environments or sensed gases/fluids or components. The SMA wire heating causes the diaphragm to change state, thereby moving a spindle or other component to actuate another function (e.g., actuate a limit switch, raise a visible indicator, shut off fluid flow, etc.). The device is reset by a mechanical force applied to the spindle, which causes the bistable diaphragm to change state back to its original position.

In another aspect of the invention, an improved bistable (or unistable) diaphragm configuration is disclosed. In one embodiment, the diaphragm comprises a plurality of radially disposed "fingers" emanating from a central portion. The diaphragm is constrained around at least a portion of its periphery, which causes the diaphragm to bow and creates the bistable/uni-stable state(s), and a meta-stable state. The diaphragm exhibits a desirable force-versus-displacement curve useful with, inter alia, the sensor and actuator embodiments previously referenced herein.

Exemplary Embodiments

Exemplary embodiments of the apparatus and methods of the present invention are now described in detail with respect to FIGS. 1-9D. It will be appreciated that while described primarily in the context of an actuator or pilot used in conjunction with a fluidic (e.g., gas, liquid, vapor, etc.) valve, the invention is in no way limited to valves, and may be applied to literally any application requiring actuator-induced movement of one or more components.

Moreover, it will be appreciated that while the various embodiments shown and described herein are described with respect to certain directions or magnitudes (e.g., upward, downward, left right, higher, lower, etc.), these directions and magnitudes are merely exemplary and relative in nature, and not in any way a requirement in practicing the invention. For instance, a device which utilizes an "upward" force in one embodiment could simply be inverted, thereby utilizing a "downward" force just as easily.

Bistable Actuator—

Referring now to FIG. 1, an exemplary embodiment of a bistable actuator assembly 100 is shown and described in detail. As illustrated, the bistable actuator 100 comprises a housing 102, with the housing 102 encasing various elements of the bistable actuator assembly 100 as described subsequently herein. The actuator assembly 100 itself may also comprise an integral valve 150 as shown.

Figure 1A:
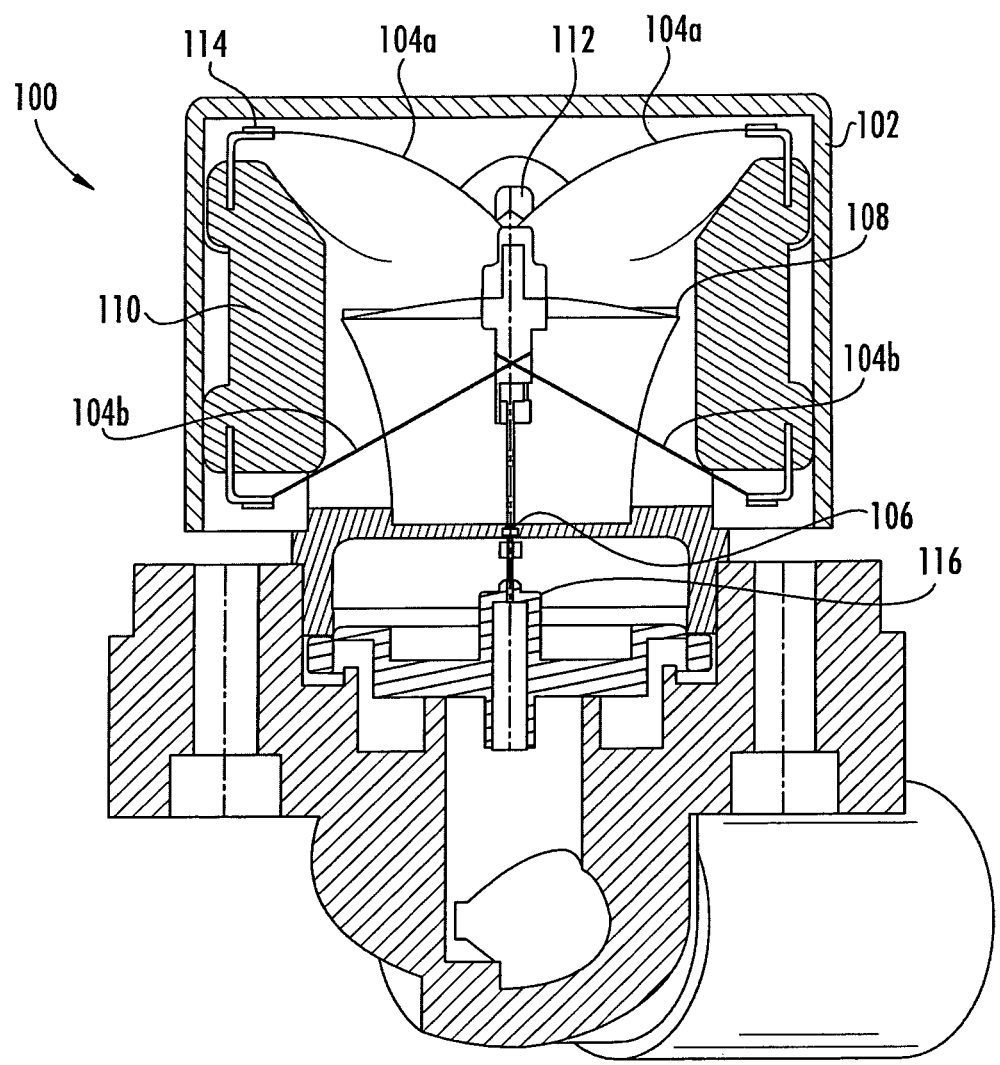
FIG. 1A is a cross-sectional view of the actuator assembly of FIG. 1 taken along line 1A-1A.

Referring now to FIG. 1A, a cross-sectional view of the actuator assembly 100 of FIG. 1 taken along line 1A-1A is shown and described in detail. The actuator assembly 100 comprises at least one alloy filament 104, a bistable diaphragm 108, a central rod 106, and a biasing element 112. The biasing element is connected to both the bistable diaphragm 108 and central rod 106. In one exemplary embodiment, the filaments 104a, 104b are adapted to, upon thermal activation, change physical shape. This is accomplished via the use of a shape memory alloy (SMA) material for the filaments. As illustrated, the filaments 104 are placed within the assembly in such a way that their resultant change in shape (i.e., during thermal activation) causes force to be applied to the biasing element 112. This force, in turn, causes the diaphragm 108 to change from a first stable configuration to a second stable configuration (hereinafter collectively referred to as "bistable configurations"). These alternating bistable configurations actuate the controlled portion 116 of the rod 106 within the valve, resulting in at least two distinct states for the valve (i.e., "open" and "closed"). The bistable diaphragm 108 is, in this embodiment, only stable in the two end states, although it will be appreciated that devices which have more than two stable states can be used consistent with the invention (e.g., tristable with three states corresponding to "open", "partially open", and "shut").

As is best illustrated in FIG. 1A, the actuator 100 preferably comprises two shape memory alloy (SMA) filaments 104a, 104b. The SMA filaments 104a, 104b are metal filaments capable of "remembering" or substantially reassuming a previous geometry. That is, an SMA filament can substantially change its geometry when heat energy is applied to the filament and subsequently, when the heat energy is removed, the filament will cool, returning substantially to its prior shape. These SMA alloys may comprise, for instance, nickel-titanium ("NiTi" or "Nitinol") alloys or copper-zinc-aluminum alloys, etc.

In the present invention, the SMA filaments have two states when non-energized: a preloaded or tensile state and a relaxed or unloaded state. In the illustrated embodiment, the original preloaded state of the SMA filaments is substantially straight (as depicted by filament 104b in FIG. 1A) and the relaxed state of the filaments is generally curved in nature (as depicted by filament 104a). When and while thermal energy is applied, the SMA filaments reduce themselves in length or contract. The application of thermal energy may, in one embodiment, be accomplished by applying a relatively small current through the filament, thereby heating the filament and altering its shape (length). The distance traveled by the diaphragm 108 during filament heating is referred to as "stroke" or "stroke distance", and the force associated with the movement or stroke is termed the "stroke force".

Depending on the type of material used, the SMA filaments used in the illustrated embodiments may have varying degrees of "memory". For example, in one variant, heating of a filament will cause its length to contract by a prescribed amount (e.g., 4% of total original length), but cooling back to its original temperature does not cause the filament to regain all of its original length, due to imperfect realignment within the material at the molecular/atomic level. Rather, a tensile stress must be applied to allow the material to regain its full original length. Such alloys are well known to those of ordinary skill, and accordingly are not described further herein. However, it be appreciated that this behavior can be accounted for in the design of the actuator described herein.

The SMA filaments are disposed above and below the diaphragm 108. The upper 104a and lower 104b filaments are each securely attached, at their ends, to a securing mechanism 114 extending from the walls of a diaphragm retaining element 110. Both the upper and lower filaments 104 are routed through the aforementioned biasing element 112, such as via respective transverse apertures formed therein. As illustrated in FIG. 1A, the biasing element 112 protrudes through the diaphragm 108 and is generally perpendicular thereto. However, it is appreciated that in alternative embodiments (not shown), the biasing element 112 may merely be in contact therewith (i.e. on one side or the other of the diaphragm 108), or alternatively the filaments can be in direct contact with the diaphragm 108 (thereby obviating at least one side of the bias element 112). The upper filament is routed through the portion of the biasing element 112 extending above the diaphragm 108, while the lower filament is routed through the portion of the biasing element 112 extending below the diaphragm 108.

The securing mechanisms of the upper filament are located on opposite sides (i.e. 180 degrees from one another as measured in azimuth) with respect to the diaphragm 108. The same is true of the securing mechanisms of the lower filament. This configuration provides a uniform spacing between the filaments 104 on both the upper and lower portions in a two-filament configuration as shown.

The illustrated filaments generally form a V-type shape or "bow" that is advantageous because this shape heightens the stroke distance as applied to the biasing element 112, thereby causing greater pull and/or push distance (stroke) for the diaphragm 108, as compared with a parallel shape configuration, as will be discussed more fully below with respect to FIG. 2.

Figure 1B:
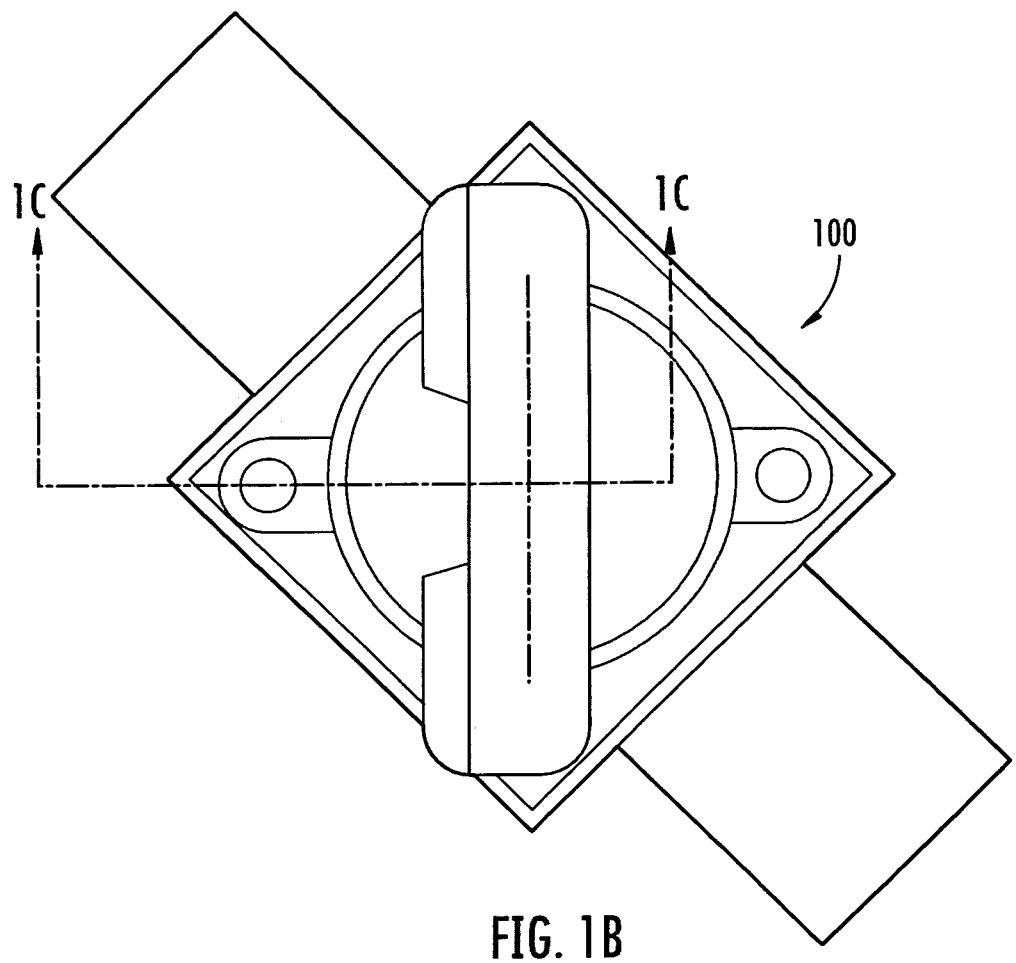
FIG. 1B is a top view of the actuator assembly of FIG. 1.
Figure 1C:
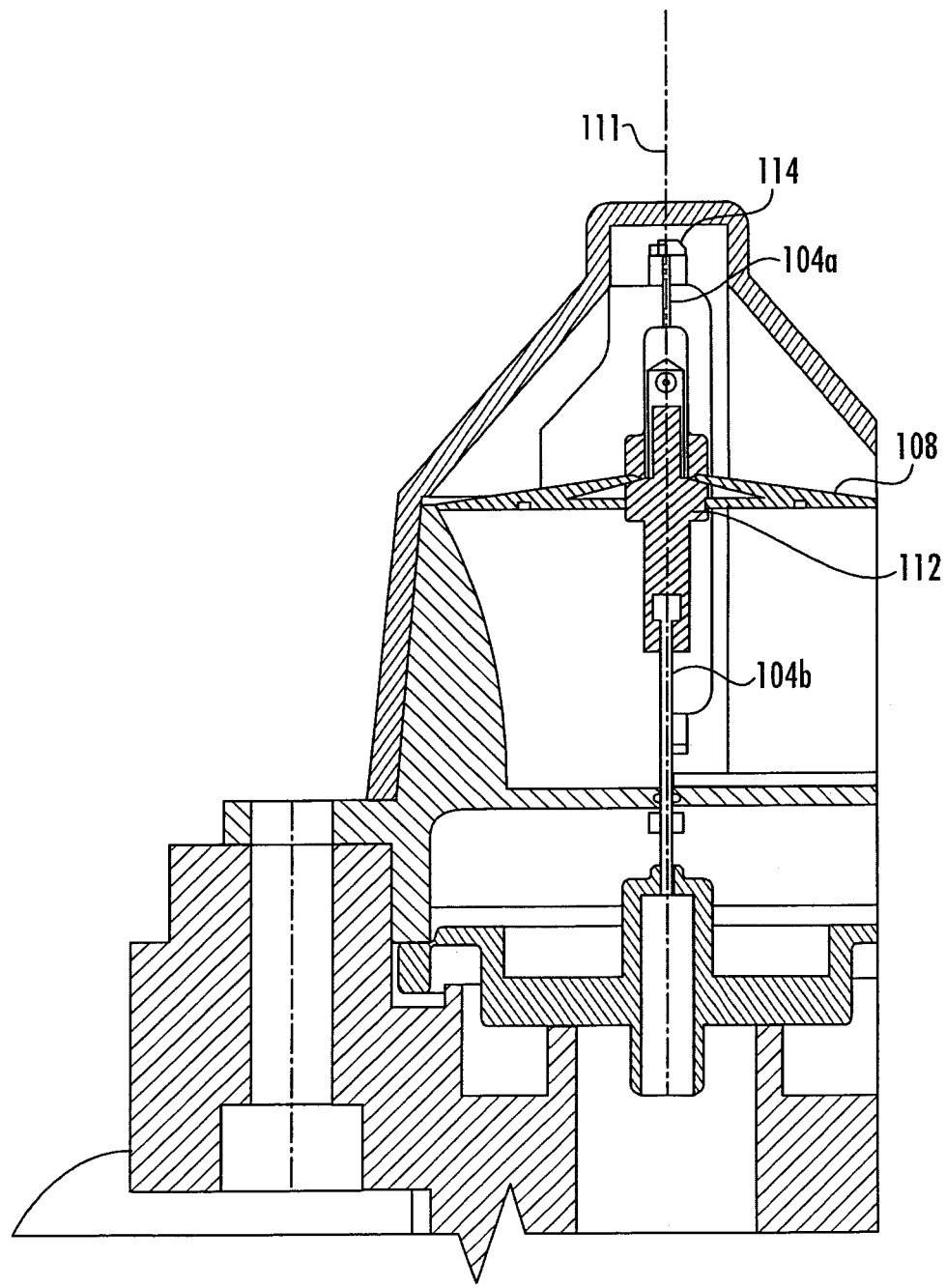
FIG. 1C illustrates a cross-sectional view of the actuator assembly of FIG. 1 taken along line 1C-1C of FIG. 1B.

The configuration of the filaments is perhaps better understood with respect to the cross-sectional view illustrated in FIG. 1C (See FIG. 1B for perspective on the relative geometry of the view illustrated). As can be seen in FIG. 1C, the top and bottom filaments 104a, 104b reside in common plane 111 with one another, although this is by no means a requirement. In some embodiments, it may be desirable for the top and bottom filaments to reside in different planes from the perspective illustrated in e.g. FIG. 1C.

The stroke force of the filaments 104a, 104b caused as the filaments 104 change shape (i.e., between de-energized and energized states) is used to pull and/or push the biasing element 112. The distance between the point where the tensioned or preloaded filament 104b is secured to a securing element 114 and the point where the filament 104b is secured to the biasing element 112 is smaller when a filament 104b is energized than when the filament 104 is in its de-energized state. Since the filament 104b is preloaded or under tension before the application of electrical current, the filaments 104b when energized contracts and pulls on the biasing element 112. As noted previously, the biasing element 112 is coupled to the diaphragm 108. Therefore, any force applied on the biasing element 112 by the stroke of a filament 104b causes displacement of the diaphragm 108.

The forces applied to the diaphragm 108 are capable of switching the diaphragm from a first stable state to a second stable state (i.e. bistable actuation). The unique bistable properties of the diaphragm 108 advantageously enable the filaments 104 to be maintained in a de-energized state without requiring the application of additional energy/electrical current since once the diaphragm passes through one or more "neutral" or meta-stable states during the foregoing state transition, the mechanical (potential) energy resident within the diaphragm will cause all further translation of the diaphragm center to the new (stable) state, and no further force from the SMA filament (and hence electrical current) is required. Thus, when a filament 104b cools down (i.e., when no current is applied), the diaphragm 108 substantially maintains the state brought about by the last application of current. This underscores a significant attribute of the illustrated embodiment; i.e., that once the aforementioned "meta-stable" state (which may or may not be the center point of travel) of the diaphragm is reached, electrical current to the pulling or preloaded filament (filament 104b in the illustration of FIG. 1A) can be turned off, thereby allowing the filament 104b to relax. This saves energy, since: (i) the current can be turned off earlier (i.e., at the meta-stable state), and (ii) the current need not be applied to keep the diaphragm (and hence valve) in its stable state.

It is also noted that the stored (potential) energy of the bistable when it is in its meta-stable state is used to advantage in the illustrated apparatus 100. Specifically, the work (energy) provided by the SMA when tensioned and energized is converted to potential energy stored within the bistable diaphragm 108 when in the meta-stable state. This potential energy is then used to move the diaphragm (and bias element 112, and anything attached thereto) to the other stable state. Hence, the mechanical work or energy done by the SMA filament 104b during contraction is largely preserved and converted to useful work.

Moreover, the filament arrangement of FIG. 1A (i.e., two substantially opposing filaments 104a, 104b) advantageously uses the aforementioned potential energy stored within the bistable diaphragm 108 to tension the other (de-energized) filament 104a when the diaphragm changes state. Specifically, the throw or stroke of the bistable diaphragm 108 from one stable state to the other determines the length of the filaments 104a, 104b, such that when the diaphragm is in one state, one filament is tensioned and the other slackened, and vice versa when in the other stable state. Hence, one filament is always preloaded and ready for actuation (such as via the aforementioned electrical current being applied, or via heat from another external source).

In that the SMA filaments 104a, 104b of the illustrated embodiment have only a certain percentage length variation (e.g., 4-5%) between energized and non-energized states, the aforementioned tensioning feature is also important to be sure that the filaments 104a, 104b do not "run out of stroke" before reaching (just past) the meta-stable state.

Although the embodiment of FIG. 1A illustrates a total of two (2) SMA filaments 104 in the configuration described above, it is appreciated that any number and configuration of SMA filaments 104a, 104b may be utilized consistent with the principles of the present invention. For example, in another embodiment (not shown), the invention may comprise two (2) SMA filaments per side. These SMA filaments may be distributed evenly around the diaphragm (in order to provide a uniform application of stroke force); however, this is by no means a requirement. The utilization of more or less SMA filaments in the "bow" configuration of FIG. 1A will correspond generally to increased or decreased stroke force requirements for the assembly 100.

In another alternate embodiment, the two filaments 104a, 104b are replaced with four (4) shorter filaments (not shown), each attached on one end to the retaining element 110 and on the other end to the bias element 112.

Figure 2:
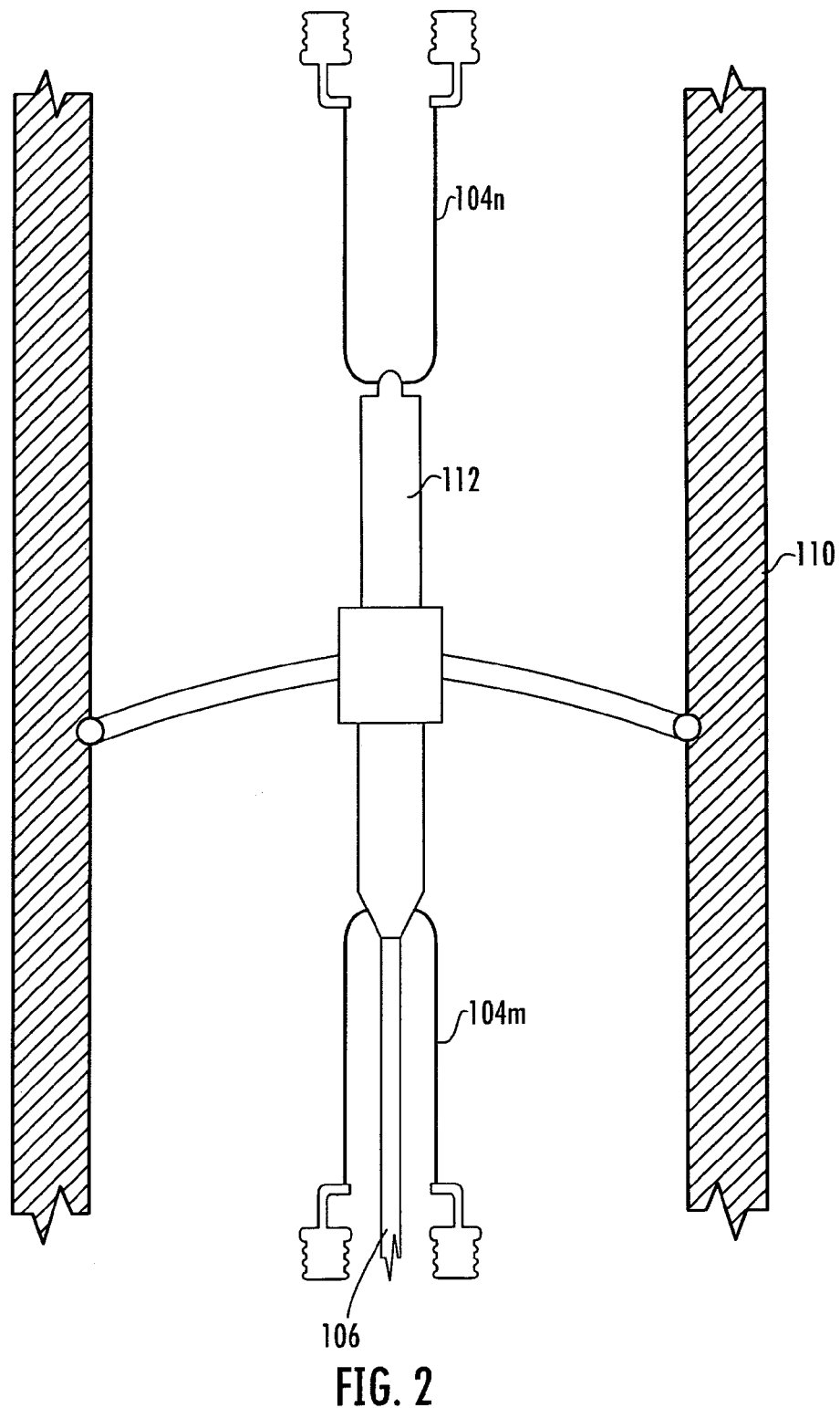
FIG. 2 illustrates a front view of a second exemplary actuator assembly manufactured in accordance with the principles of the present invention.

In yet another embodiment, illustrated in FIG. 2, the filaments are placed in a parallel configuration (rather than in a V-shape). Each of the filaments is then attached to a portion of the biasing element 112. In other words, as shown in FIG. 2, the upper one or more filament(s) 104n will attach to the upper portion of the biasing element 112, and the lower one or more filament(s) 104m will attach to the lower portion of the biasing element 112. Alternatively, the filaments may be attached to a surface of the diaphragm 108a, 108b. As described above, the filaments 104n, 104m have two states: one de-energized and the other energized. Moreover, the alternate filament tensioning system described with respect to FIG. 1A above is utilized, as demonstrated by filaments 104n and 104m of FIG. 2 respectively. Application of energy to the tensioned filament 104m will cause the biasing element 112 to pull the rod away from the filament 104n, the latter receiving the tensioning force as the diaphragm translates to the other bistable state. A configuration such as this one, having multiple parallel (i.e., longitudinal with respect to the stroke of the bias element 112) filaments 104n, 104m results in greater stroke force (the force generated when the filaments 104 change from one to the other shape) than the previously described V-shaped filament 104 configuration; however, there will be less stroke distance associated with the movement of the filaments 104n, 104m in such a parallel filament orientation.

It is noted that utilization of parallel filaments 104n, 104m, as discussed above, enables the overall appearance of the actuator 100 to comprise a taller, thinner shape, including e.g., a cylinder, square, rectangle, etc. Such a shape may be beneficial in certain applications such as where a taller, thinner (laterally) profile is needed (along with less stroke distance/more force on the bias element 112).

It is also appreciated that the SMA filaments may be of varied or uniform thickness. The thickness of SMA filaments is determinative of the force associated with the filament's change in length, and with the length of time (latency) and amount of energy necessary to cause the change in the filament's length.

Therefore, it is appreciated that a plurality of configurations having different number and diameter of filaments 104 may be utilized consistent with the present invention to provide various desirable effects. For instance, in one variant, a plurality of small filaments disposed substantially in parallel are used to provide both low latency and high pull force, since (i) the forces of each individual filament are essentially additive, and (ii) the latency with each individual filament is low due to its small diameter. This advantageously provides the same level of force that a larger filament would, but without the greater latency associated therewith. However, such an arrangement requires an increase in electrical current over that for a single filament, since each individual filament must be actuated.

In another variant, a number of different filaments with different thicknesses are used in parallel, thereby giving a distribution of force and latency. In contrast to the variant previously described wherein all filaments are of the same thickness, this latter variant results in the force applied by the filament being distributed over time, since each filament will contract (assuming the same start time for the application of current) over a different period of time, and with a different force level. The time and/or level of applied current can also be adjusted so as to create the desired force/time profile.

Bistable Diaphragm—

Figure 3:
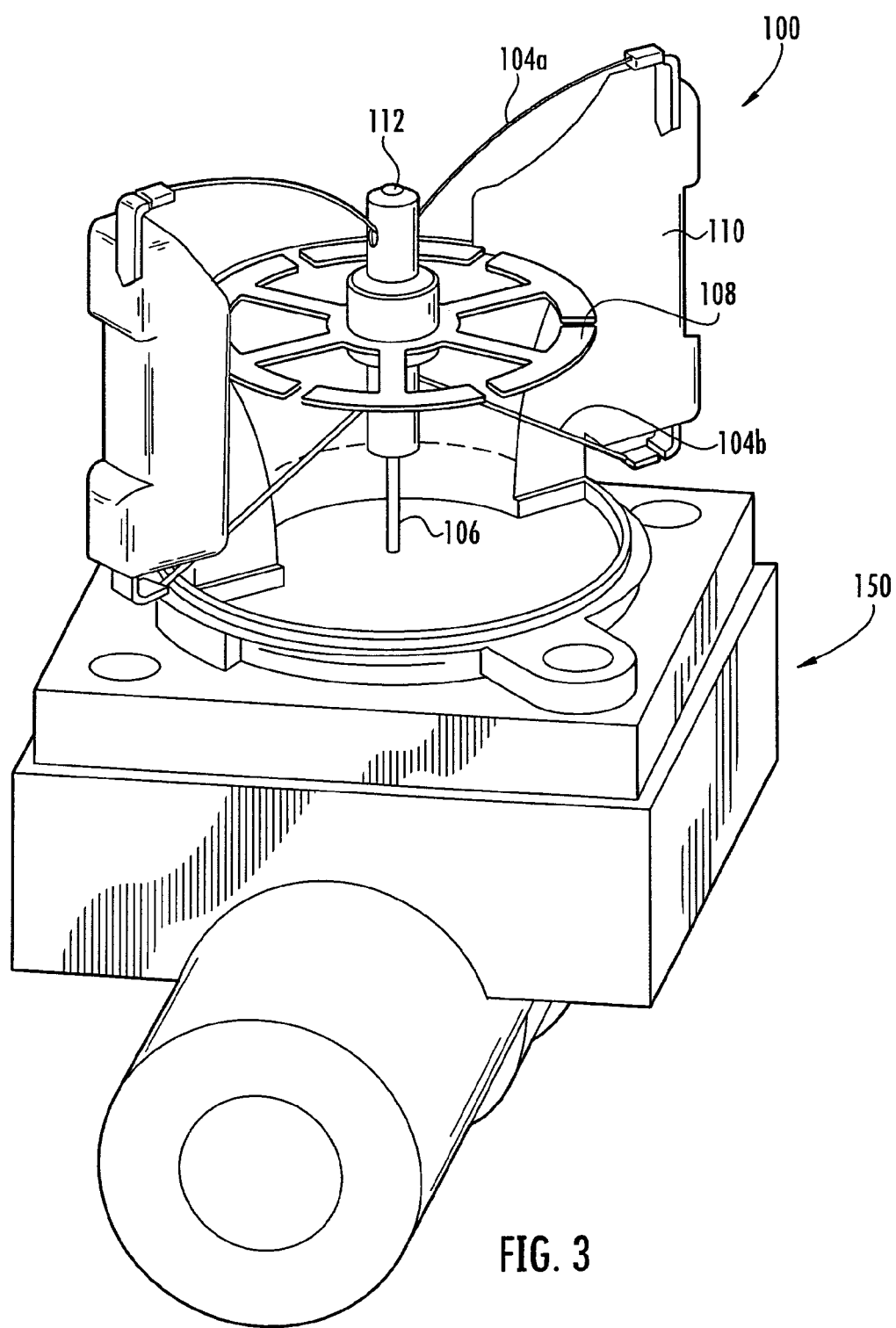
FIG. 3 illustrates a perspective view of the exemplary actuator assembly of FIG. 1 with the top cover removed.

The exemplary embodiment of the bistable diaphragm 108 of the device 100 of FIG. 1 is best illustrated in FIG. 3. As shown, the bistable diaphragm 108 in this illustrated embodiment generally comprises a disk-shaped entity. As noted previously, the bistable diaphragm 108 is adapted to comprise two stable states and at least one meta-stable state. The first stable state of the bistable diaphragm 108 is a convex shape (upward) and occurs when the disk, as shown within the actuator 100 in FIG. 3, bulges or protrudes in an upward direction. The second stable state of the bistable diaphragm 108 is a convex shape (downward), and occurs when the disk as shown within the actuator 100 in FIG. 3 bulges in a downward direction. These formations are considered stable in nature because no energy is required to maintain the diaphragm 108 in either of these two states. Energy is required, however, to cause the diaphragm to change between the two states, as previously described. While traversing between states, the meta-stable state(s) is/are reached, which comprise states that while not stable, are effectively the transition points between the diaphragm entering one stable state or the other. Stated differently, when the diaphragm 108 is in one stable state, it needs to be moved only to just beyond the meta-stable state for it to change to the other stable state on its own (due to stored potential energy). It will be appreciated that the diaphragm, depending on design, may have one meta-stable state (e.g., roughly at the centerpoint of travel), or multiple meta-stable states (e.g., one for each direction of travel that are not located at the same point).

The unique shape of the bistable diaphragm element 108 is such that the activation energy (energy needed to change the state of the diaphragm 108 from one stable state to another) is very minimal. This is because the shape of the diaphragm 108 is such that after an initial force is applied (e.g. the stroke force associated with one of the SMA filaments 104a, 104b) to a diaphragm in a first stable state and the meta-stable state is reached, the diaphragm 108 will transition into the second stable state with no additional force applied.

For example, if the diaphragm 108 of FIG. 1A is in a convex upward configuration with the lower filament 104b having a tensioned state, when energy is applied to the filament 104b, the filament will contract and cause the highest point of the diaphragm 108 (e.g., the center) to be displaced toward the lower filament 104b. As noted above, the exemplary diaphragm 108 has only two stable states: when the center is at the highest (upward) point and when the center is at the lowest (downward) point. Displacement of the center of the diaphragm 108 away from the highest (or lowest) position places the diaphragm 108 in an unstable configuration, the meta-stable state being the unstable configuration wherein no further force is required to cause the state transition.

It is appreciated that the amount of force required to change states with the diaphragm 108 may in one embodiment be less than the peak or maximal stroke force of the SMA filaments 104, thus rendering the overall system highly power efficient. In other words, the diaphragm 108 and filaments 104a, 104b may be adapted such that, when in a first stable state, less than the entire amount of force to be exerted by an SMA filament 104 as it is thermally activated is required to place the diaphragm 108 in the unstable "meta-stable" state, thus triggering the reconfiguration of the diaphragm to a second stable state as described above, i.e., only a portion of the force an SMA filament 104 may exert is required to cause a change in the state of the diaphragm 108.

For example, given a bistable diaphragm 108 having a total distance between its uppermost and lowermost points of 0.12 inches (3.05 mm) and an SMA filament(s) 104a, 104b adapted to, upon application of sufficient energy, cause the diaphragm 108 to move the full 0.12 inches (3.05 mm), a stroke distance less than the full stroke distance of 0.12 inches (3.05 mm) is enough to cause the diaphragm 108 to thereafter conform to a stable state. The full stroke of the filaments 104 is not required to cause the diaphragm 108 to change from one stable state to another. Rather, an application of force causing the diaphragm 108 to move at least beyond a meta-stable point between the first and second stable states (which may or may not be the physical midpoint, depending on the design) will be sufficient to cause the diaphragm 108 to move to the next stable state automatically.

Figure 3A:
FIG. 3A-3J illustrate a top elevational view of various exemplary bistable diaphragm shapes manufactured in accordance with the principles of the present invention.
Figure 3F:
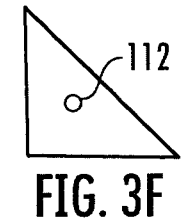
Figure 3B:
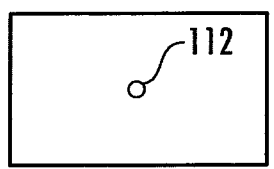
Figure 3G:
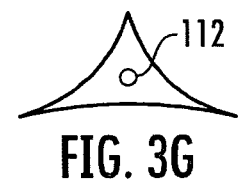
Figure 3C:
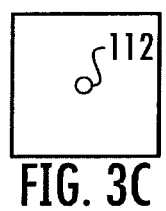
Figure 3H:
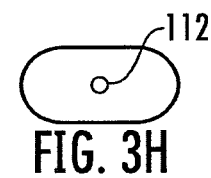
Figure 3D:
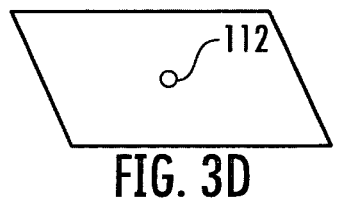
Figure 3I:
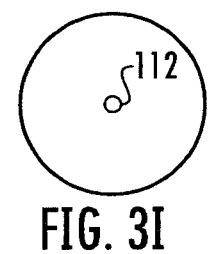
Figure 3E:
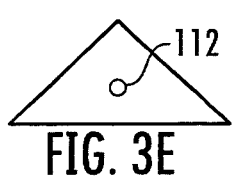
Figure 3J:
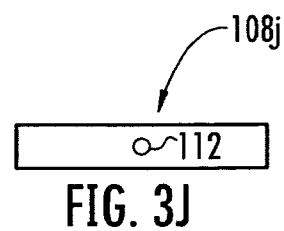

Although the embodiment of FIG. 3 gives a circular "wagon wheel" shaped bistable diaphragm element 108, it is appreciated that the bistable diaphragm element 108 of the present invention may comprise any number of alternative shapes. Various other exemplary bistable 108 shapes are given in FIGS. 3A-3I. For example, the bistable 108 may comprise a 4-sided "star" (FIG. 3A), a rectangle (FIG. 3B, FIG. 3J), a square (FIG. 3C), or a parallelogram (FIG. 3D). FIGS. 3E and 3F illustrate that the bistable 108 may also comprise an equilateral triangle or a right triangle, respectively. The bistable 108 may likewise resemble a deltoid (FIG. 3G). It is further appreciated that the bistable 108 may comprise any shape having one or more straight edges the above being merely exemplary of a broader range of shapes. Alternatively, the bistable 108 may be generally circular in nature such as the ellipse (FIG. 3H) or circle (FIG. 3I) or other shape resembling a fan, a clover leaf, or having "arms". It is also appreciated that any of the aforementioned shaped bistable diaphragms 108 may be solid in nature or may include one or more gaps or openings. Other exemplary bistable configuration will be discussed below with respect to FIGS. 10-10D.

Another alterative embodiment of a bistable actuator assembly 400 is illustrated in FIG. 4. The illustrated embodiment is designed to utilize an elongated rectangular bistable diaphragm 108 such as that given in FIG. 3J discussed above. Utilization of this particular shape of diaphragm 108 (elongated rectangular) is useful in giving the bistable actuator assembly 400 a relatively shallow the depth, d, which results in a slim profile assembly 400.

FIG. 4A is a cross-section of the "slim" assembly 400 take along line 4A. As shown, the bistable actuator assembly 400 generally comprises a rectangular bistable diaphragm 108j, a rectangular biasing element 112j and two upper 104x and lower 104y SMA filaments. In much the same manner as discussed above, the relaxing and contracting of the SMA filaments 104x, 104y causes the bistable diaphragm 108 to change between two stable configurations. The change in configuration causes a rod element 106 to be displaced thus opening and closing a valve associated with the actuator 400. Also illustrated in FIG. 4A, the housing element 110 further comprises a channel 402 within which the biasing element 112j is adapted to snugly fit. The channel 402 and/or biasing element 112*j* of the present embodiment may be outfitted with friction reducing elements so as to enable the biasing element 112*j* to move up and down (given by the arrows A and B) within the channel when causing the bistable diaphragm 108*j* to change configurations.

FIG. 4B is a cross-section of the "slim" assembly taken along line 4B. As illustrated, the channel 402 in the housing 110 acts as a keying feature which snugly yet slidably accepts the biasing element 112*j*, thereby maintaining positive alignment of the diaphragm and filaments. As is also clear from FIG. 4B, the biasing element 112*j* is larger at the channel 402 than the rectangular diaphragm 108*j*; thus, the biasing element 112*j* substantially prevents twisting and other deformation of the elongated rectangular diaphragm 108*j*.

It is appreciated that, although illustrated as a rectangular biasing element 112*j* and rectangular keying channel 402, other shapes may be utilized consistent with the present invention.

Electrical Package—

As noted above, the present invention requires the application of energy to the filaments 104 in order to cause the filaments to change shape (e.g., length).

Figure 5A:
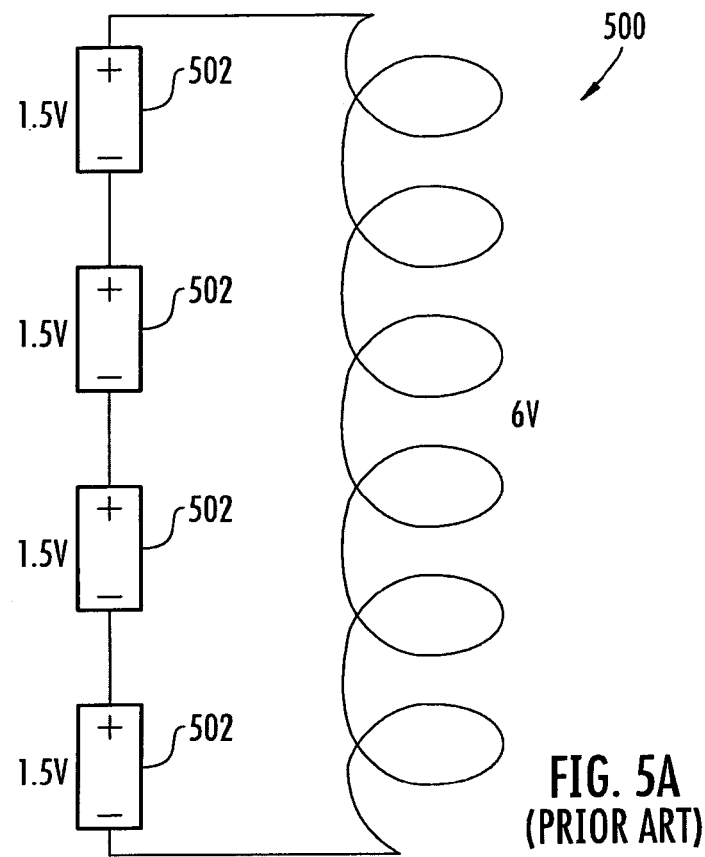
FIG. 5A illustrates a prior art battery power apparatus having four (4) batteries placed in series to operate a solenoid.

In the prior art, energy is applied to the solenoid actuator 500 by way of a number of low-voltage batteries or cells 502 in series, as illustrated in FIG. 5A. As shown in the example of FIG. 5A, the solenoid actuator 500 requires 6.0V of power for functioning. Thus, four (4) +1.5V batteries 502 are placed in series and into electrical connection with the coiled wires of the solenoid actuator 500. The total power requirement per cycle of the prior art solenoid actuator 500, $P_{prior\ art}$, given as:

$$P = I \times V \quad \text{Eqn. 1}$$

$$P_{prior\ art} = 2.0\ A \times 6.0\ V = 12.0\ W \quad \text{Eqn. 2}$$

In order to provide adequate power to the solenoid actuator 500, each of the batteries 502 must produce sufficient voltage. If any one of the batteries 502 of the series does not apply the appropriate potential (i.e., 1.5V in this example), the solenoid actuator 500 will not function.

Figure 5B:
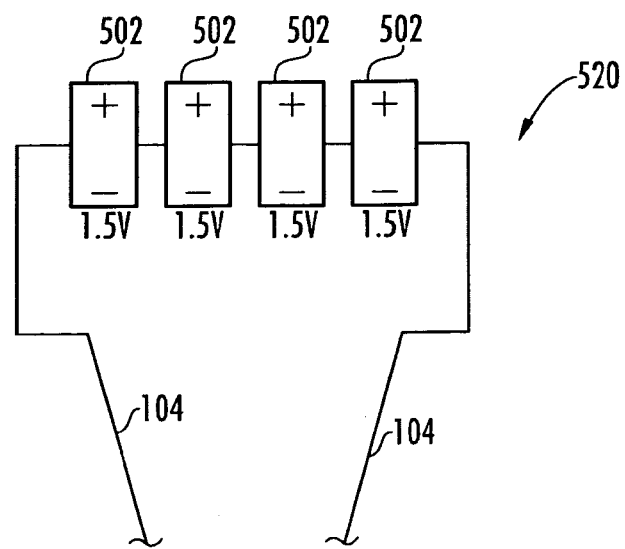
FIG. 5B illustrates a battery power apparatus comprising four batteries placed in parallel manufactured in accordance with the principles of the present invention.

Referring now to FIG. 5B, an exemplary electrical package 520 for use in the present invention is shown. As illustrated, the package 520 comprises batteries 502 placed in parallel (rather than in the series arrangement of the prior art); although shown as four (4) cells 502, the electrical package 520 may comprise any number of batteries. The +1.5V batteries 502 placed in parallel as shown will apply an overall voltage of 1.5V, which produces current (additive in this configuration) sufficient to cause the SMA filaments 104*a*, 104*b* of the above embodiments to change from a relaxed or de-energized state to their contracted state. The total power requirement per cycle of the electrical package 520 for use in the present invention, $P_{SMA}$, is given as:

$$P_{SMA} = 0.5\ A \times 1.5\ V = 0.75\ W \quad \text{Eqn. 3}$$

Hence, a significant reduction in power (P) is achieved using the SMA-based approach of present invention as compared to the prior art solenoid-based approach. This allows the same four cells used in the prior art solenoid device to last appreciably longer in the parallel SMA-based device of the present invention, thereby: (i) reducing operating cost per unit time (i.e., less batteries per unit time); (ii) reducing labor costs per unit time (i.e., fewer man-hours for replacements of the batteries in a given time period); and (iii) making the operation of such devices more "green", since fewer batteries will need to be disposed of in an ecologically responsible manner.

It will also be appreciated that with respect to items (i)-(iii) above, there is also an implicit benefit accrued; i.e., that maintenance or repair personnel, when diagnosing a series-arranged actuator failure, may determine that one or more cells are at fault, and replace them en masse as opposed to replacing only the defective or failed cell. Similarly, in the context of schedule preventive maintenance, an exemplary maintenance schedule may specify replacement of cells every six months, or when failure of one cells occurs. This approach results in cells which have not yet failed being replaced (ostensibly so as to obviate a second and subsequent maintenance calls), which is wasteful and very ecologically unsound since cells with significant remaining life (i.e., those which did not fail) are disposed of early.

In contrast, by using a parallel configuration as in the present embodiment, one or more cells can fail while allowing the actuator to continue operating, and all the cells will only be replaced when the actuator no longer functions (thereby corresponding to a greater state of depletion for all of the cells).

Placing the batteries 502 in a parallel configuration also ensures reliability. Specifically, the actuator will continue to function if up to three of the batteries 502 should lose charge, etc. (assuming a good state of charge for the remaining cell). Parallel battery 502 configurations further enable the batteries to have extended lives, as each of the batteries in parallel shares the load applied across its terminals (i.e., the current is divided among the cells). Per preliminary evaluations by the inventor hereof, placement of the batteries in the aforementioned parallel configuration will decrease the internal battery resistance approximately four (4) times relative to one single battery (i.e., to one-fourth), and sixteen (16) times (i.e., to one-sixteenth) relative to the prior art connection utilizing four such batteries in series.

As stated previously, the SMA filaments 104*a*, 104*b* of the present invention require energy to cause a change in length. In other words, the application of energy will cause the filaments 104*a*, 104*b* to shorten. As the energy is removed, the filaments 104*a*, 104*b* cool and return to an elongated state. Energy need only be applied to the filaments to cause a change in the state of diaphragm 108 as previously described. After the diaphragm 108 has changed state, the position and/or relative pull or push of the filaments will not affect the diaphragm 108. The power consumption of the prior art electrical package, $C_{prior\ art}$, and of the electrical package 520 of the present invention, $C_{SMA}$, are given below:

$$C = P \times T \quad \text{Eqn. 4}$$

$$C_{prior\ art} = 12.0\ W \times 0.03\ \text{sec} = 0.36\ \text{w-sec} \quad \text{Eqn. 5}$$

$$C_{SMA} = 0.75\ W \times 0.10\ \text{sec} = 0.075\ \text{w-sec} \quad \text{Eqn. 6}$$

The energy applied may take the form of battery supplied power (as discussed above), or alternatively from a fixed power supply source (e.g., an AC/DC converter, UPS, etc.) or even a solar cell arrangement. It is also appreciated that in another embodiment (not shown), heat energy may be applied from alternative sources such as via, conductive, convective, or radiated heat transfer (thereby obviating the need for resistive heating of the filament via electrical current).

Alternative Embodiments

Switching Valves—

Figure 6:
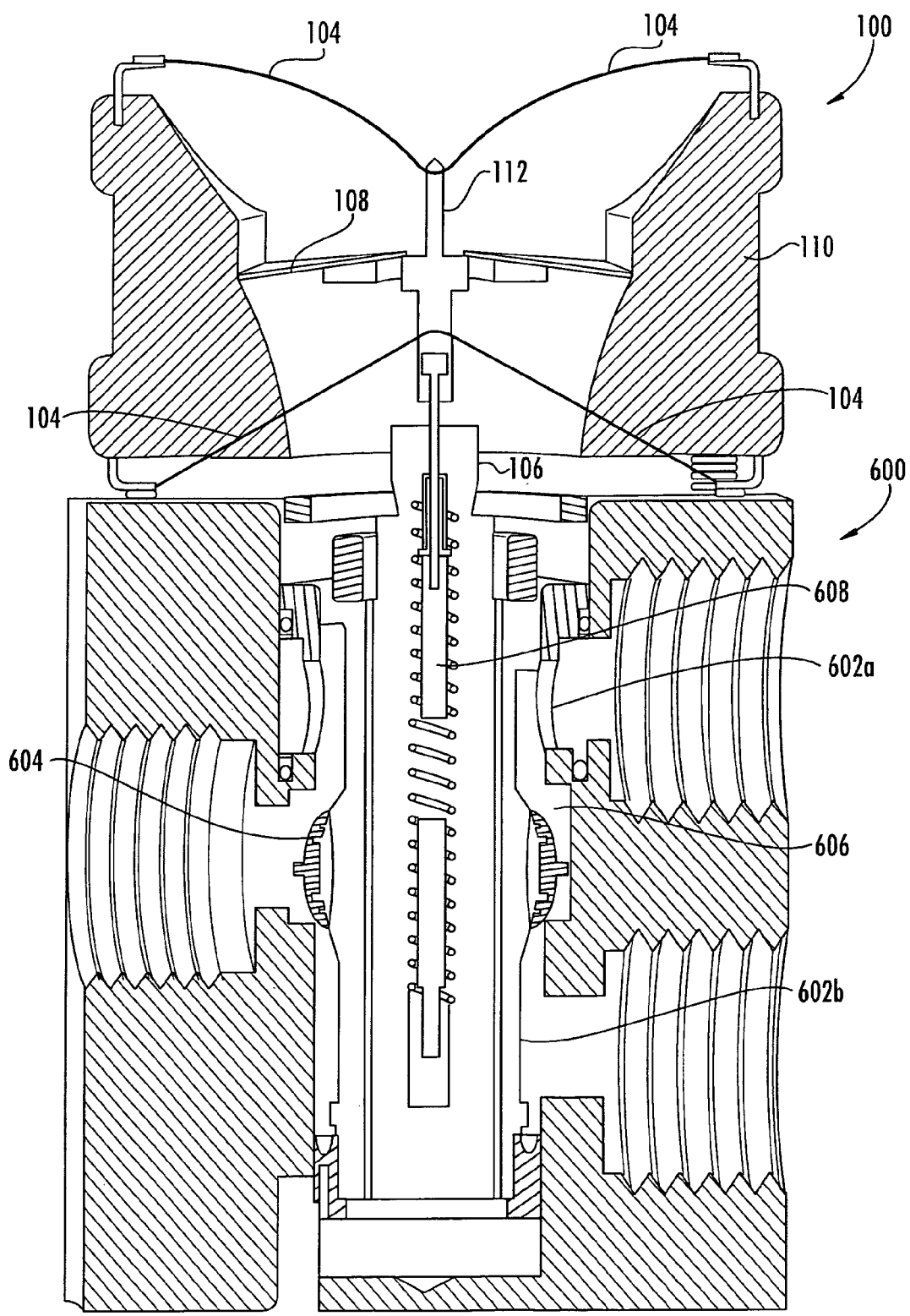
FIG. 6 illustrates an exemplary bistable actuator used in conjunction with a switching valve manufactured in accordance with the principles of the present invention.

The bistable actuator 100 of any of the above embodiments of the present invention may, in one embodiment, be used in conjunction with a switching valve. An exemplary bistable actuator 100 used in conjunction with a switching valve 600 is illustrated in FIG. 6.

As illustrated, the rod 106 of the bistable actuator 100 is adapted to be connected to a flow control element 608. The flow control element controls the flow between any two of a multitude of receiving ports 602 of a switching valve via at least one flow opening 606. The embodiment of FIG. 6 illustrates a switching valve having only two (2) receiving ports 602 and one delivery port 604; however, the switching valve may comprise any number of delivery and receiving ports. Thus, the position of the flow control element 608 with respect to the delivery 604 and receiving ports 602 will determine to which of the receiving ports 602 flow will be allowed. In one embodiment, the flow control element 608 (and its openings 606) will be configured such that at any one time flow will be restricted to one receiving port 602 while permitted to the other receiving port 602. Alternatively, these may be configured to either restrict or allow flow to both receiving ports 602a and 602b simultaneously. In yet another embodiment, the flow control element 508 (and its openings 606), may be configured to permit back flow, i.e., flow only between the two receiving ports 602.

Pilot Valves—

In yet another embodiment (not shown), the bistable actuator 100 may be used as pilot or control valve for a larger valve. The larger or parent valve will typically comprise a valve type different from the SMA embodiments described herein, such as, a solenoid actuator. As is well known, a pilot valve is a small valve that controls a limited-flow feed in conjunction with a separate valve controlling a high-pressure flow. The pilot valve helps to reducing the pressure differential on the larger valve (e.g., by equalizing across the two sides of the valve disc, or allowing the high pressure on one side of the valve to aid in opening the valve by porting it to the low-pressure side), thus enabling the high pressure valve to be operated with reduced force (and/or energy) requirements.

Moreover, a pilot valve can be located at a significant distance from the main or parent valve if desired, so as to provide enhanced accessibility and/or personnel safety (e.g., shielding or reduced exposure to heat, chemicals, radiation, etc.), or reduced noise.

Gas Valves—

In yet another embodiment (not shown), the bistable actuator 100 may be utilized in conjunction with the regulation of gases such as, for example, via the use of oxygen valves. Specifically, the bistable actuator 100 may control the flow of oxygen in e.g., industrial processes including the manufacture of steel and methanol (such as for oxyacetylene welding equipment and gas cutting torches). Other exemplary uses include, valves regulating the flow the liquid rocket propellants in rocket engines; in medical breathing gas apparatus adapted for both medical facilities and at home; for breathing at altitude in aviation, whether in a decompression emergency, or for continual use (such as in the case of unpressurized aircraft); and in gas blending for creating diving breathing mixes such as nitrox, trimix and heliox. It is further appreciated that a bistable actuator may be used in valves for controlling the flow of other gases as well.

Advantageously, the use of an SMA actuated valve operated by a low-voltage power source incorporating electronic components (e.g., 1.5 V batteries arranged in parallel, versus e.g., 6V in series) also reduces the chance of explosion when carrying potentially explosive gases such as oxygen or hydrogen.

Temperature-Induced Shut-Off Valves—

In yet another embodiment (not shown), the bistable actuator 100 of the present invention may be used as a temperature-induced shut-off valve. In other words, the bistable actuator 100 may be adapted or use in situations where certain ambient or internal temperatures are indicative of malfunction or failure. In one example, the bistable actuator 100 may be used to shut a fuel or gas valve if the temperature of the fuel becomes too high. According to this embodiment, the actuator 100 may not comprise an electrical package as discussed above, but rather, the SMA filaments 104 would be responsive to temperature changes from other sources. Specifically, they would be placed and thermally coupled so that a given temperature in the fluid would be communicated directly or indirectly to the SMA filaments, thereby inducing their contraction. For instance, a small bypass channel for fluid could be run through the actuator so that the heated fluid could heat the actuator (including the SMA filaments); this system could be calibrated so that when the fluid hit a target temperature, the heat conduction/convection/radiation into the SMA actuator would be sufficient to actuate the value (or pilot), thereby shutting off or initiating flow as desired.

Utilization of the aforementioned bistable actuator assembly 100 as a pilot valve for a larger valve, as a gas valve, and/or as a temperature-induced shut off valve provides a low-power requiring and/or consuming alternative to the solenoid actuators given in the prior art. Also, as is important in critical applications (e.g., those directly affecting human health), the bistable actuator assembly 100 and parallel-arranged power source of the present invention has a more reliable power delivery and may function properly when only one battery of the electrical package 520 is functioning, thereby providing enhanced reliability.

Manufacturing Methodology—

Figure 7:
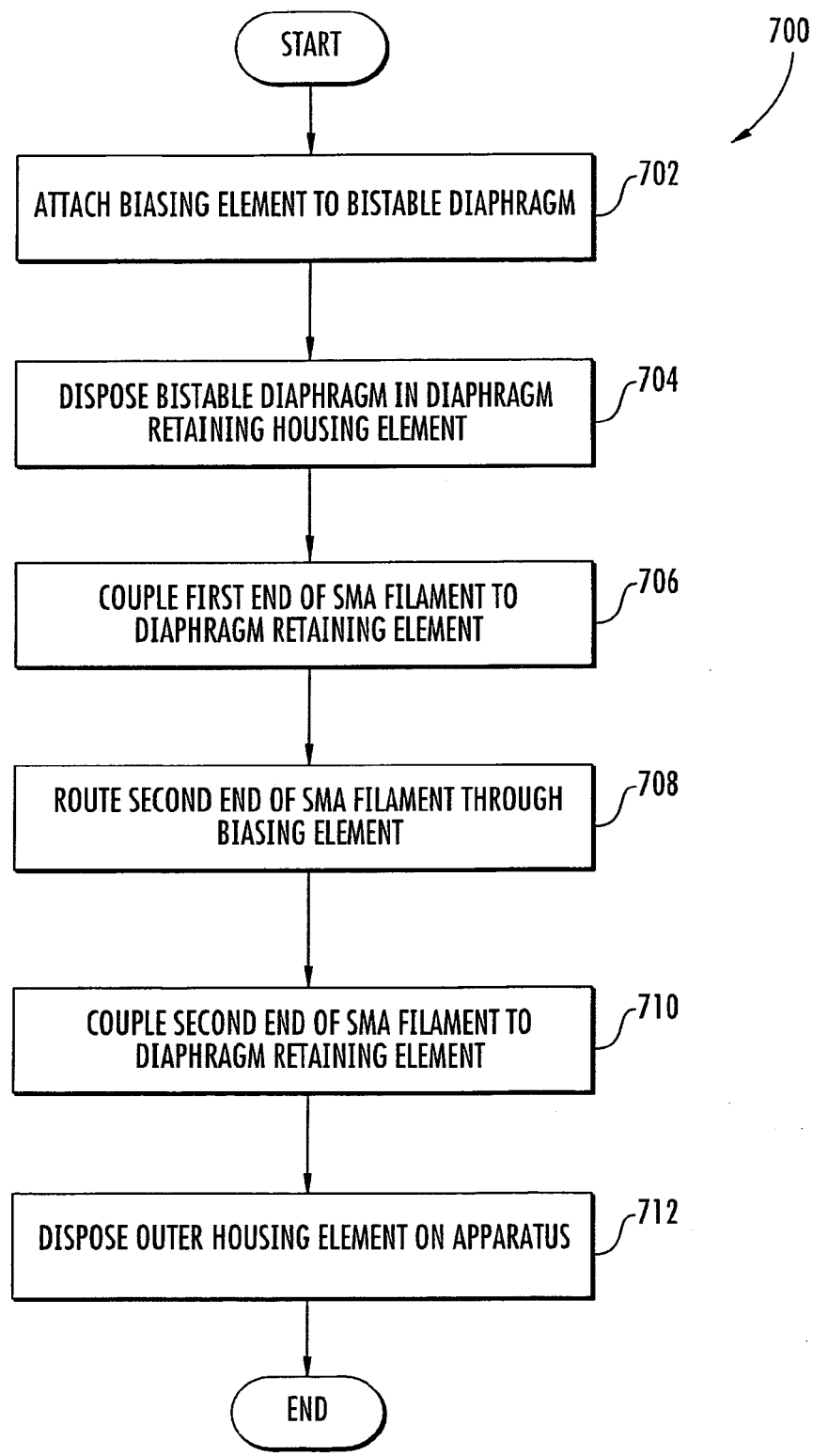
FIG. 7 illustrates a process flow of an exemplary method of manufacturing a bistable actuator in accordance with the principles of the present invention.

Referring now to FIG. 7, an exemplary method 700 of manufacturing a bistable actuator 100 is given.

At step 702, the biasing element 112 is attached to the bistable diaphragm 108. This can be accomplished via any number via any number of known mechanical attachment techniques including adhesives, crimping, threading, friction fit, welding or soldering, etc.

Per step 604, the bistable diaphragm 108 is disposed within a diaphragm retaining housing element 110. This includes securing of fixing at least portions of the edges of the diaphragm 108 to the housing element so that the bias element 112, under SMA filament force, can deflect the center region of the diaphragm, thereby causing it to change state. In one embodiment, the biasing element is coupled to the rod 106, thereby supporting the assembled bistable diaphragm within the retaining housing element 110.

At step 706, one end of a SMA filament 104 is coupled to the aforementioned housing element 110. This can be accomplished, in one embodiment, by securing the SMA filament to the securing mechanism 114 via soldering, welding, crimping, adhesives, or the like. It will be appreciated that based on the design and size of the actuator and its SMA filaments, the secure coupling of the SMA filaments to the housing (or other component(s)) can be critical to the operation of the actuator, since if the SMA filament ends "slip", the travel or throw of the diaphragm 108 may be insufficient to cause a state change. Hence, in one embodiment, strong and unyielding crimps such as those described in co-owned and co-pending U.S. patent application Ser. No. 11/473,567 filed Jun. 22, 2006 and entitled "Apparatus and Methods for Filament Crimping and Manufacturing", which is incorporated herein by reference in its entirety, although other crimping and non-crimping techniques may be used consistent with the invention as well. It is noted that the foregoing referenced crimping technique provides the salient advantage of being able to securely crimp; i.e., without any significant creep or give, very fine (small diameter) filaments, thereby allowing for smaller filaments within the actuator than would otherwise be achievable using conventional fastening techniques. In the present context, the use of smaller filaments has a distinct advantage; i.e., the ability to use less electrical power to heat the filament(s), and/or more rapid reaction time for the same electrical power, thereby providing a salient improvement over prior art actuators.

At step 708, the second end of the SMA filament is routed through the biasing element (e.g., aperture) and then attached to a second securing mechanism 114 opposed to the first. The process is repeated for the bottom SMA filament at step 710. As previously described, the lengths of these filaments are carefully set so as to place one in tension at all times (depending on the position of the bistable diaphragm).

At step 712, an outer housing element 102 is disposed about the apparatus, thereby providing a protective and/or environmental covering.

Figure 8:
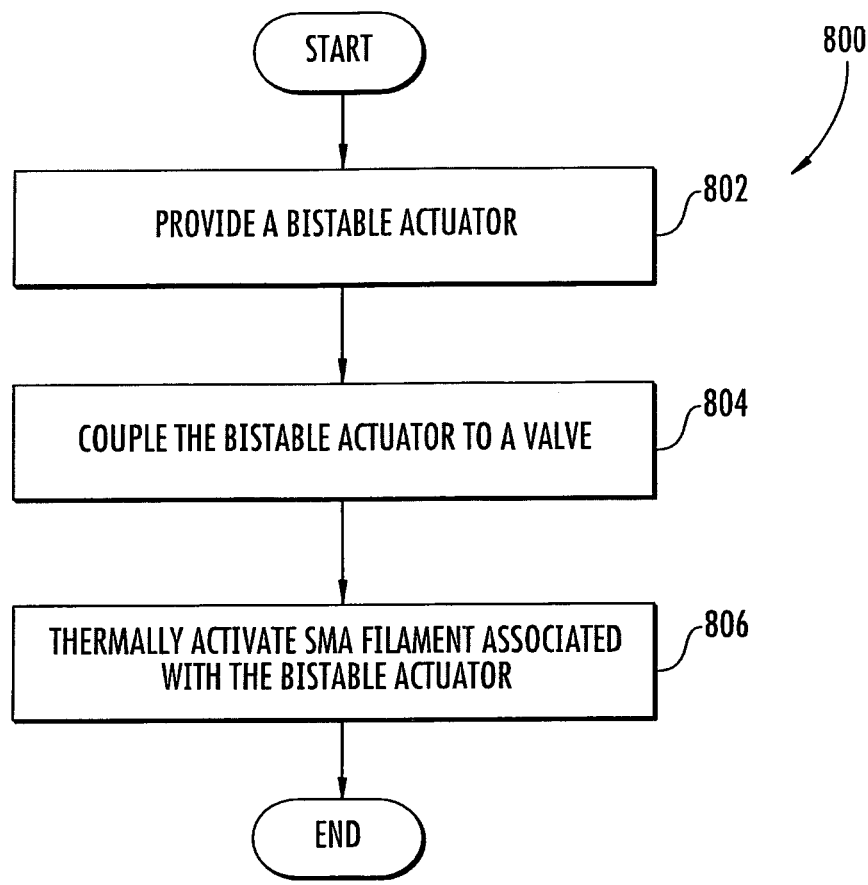
FIG. 8 illustrates a process flow of an exemplary method of operating a bistable actuator in accordance with the principles of the present invention.

Referring now to FIG. 8, an exemplary method 800 of operating a bistable actuator 100 is given. As illustrated, the method 800 comprises first, at step 802, providing a bistable actuator 100 having a bistable diaphragm 108 coupled to a biasing element 112 and at least one SMA filament 104. The bistable diaphragm is adapted to determine the position of at least one controlled portion 116 via a rod 106, as shown in FIG. 1A. This controlled portion 116 might for example be a diaphragm or valve stem of a pilot valve.

At step 804, the bistable actuator 100 is coupled to a valve or other device to be controlled (e.g., the aforementioned pilot valve).

Per step 806, the SMA filaments 104 of the bistable actuator 100 are thermally activated. The thermal activation of one of the SMA filaments 104a, 104b causes the biasing element 112 to exert force on the bistable diaphragm 108, thereby causing the bistable diaphragm 108 to change from a first stable state to a second. The thermal activation may be the result of the application of heat energy in the form of battery power (resistive or Ohmic heating), solar power, conduction/convection/radiation from a nearby heat source, etc. The change in form of the diaphragm 108 from a first to a second stable state causes the controlled portion 116 to change from a first position to a second. For example, one position of the controlled portion 116 is an "open" valve position, and the other a "closed" or shut position. Thus, the activation of one of the SMA filament 104a, 104b causes a valve associated with the controlled portion to open or close.

Bistable Latch Assembly—

Figure 9:
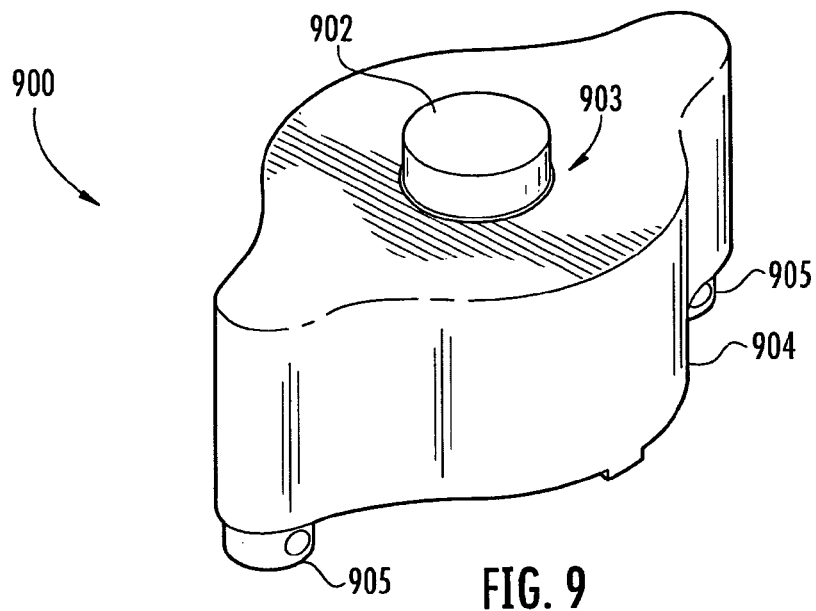
FIG. 9 illustrates a perspective view of an exemplary bistable latch assembly manufactured in accordance with the principles of the present invention.

Referring now to FIG. 9, one embodiment of a bistable latch assembly 900 is shown and described in detail. As illustrated, the bistable latch assembly 900 comprises a housing 904, with the housing 904 encasing various elements of the bistable latch assembly 900 as described subsequently herein. The housing 904 further comprises a central aperture 903 within which the plunger head 902 of the bistable latch assembly 900 is adapted to slide (discussed in greater detail below).

The housing 904 may also comprise one or more attachment features 905. The attachment features 905 are in one variant adapted to secure the assembly 900 onto other devices and/or assemblies (not shown). While the features 905 illustrated are shown as comprising pins having a central opening it will be appreciated that other types or shapes of attachment features 905 may be utilized as well. For example, fasteners, hooks, threaded screws or threaded apertures, cotter pins, C-clips, interference or friction devices, adhesives, etc. may be employed consistent with the present invention. Alternatively, the attachment features may be obviated by way of e.g., an external structure (not shown) which receives or clamps onto the housing 904, such as for instance a component with a recess formed therein which receives the device housing 904. Myriad other approaches to securing the device 900 in place will be recognized by those of ordinary skill given the present disclosure.

Figure 9A:
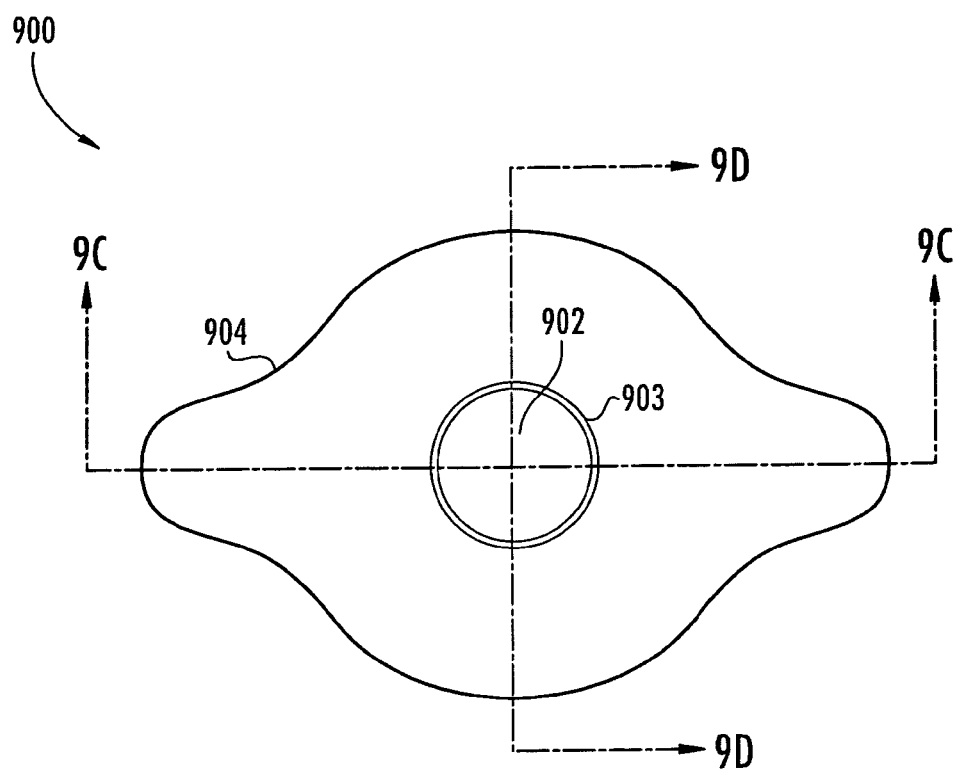
FIG. 9A illustrates a top elevational view of the exemplary bistable latch assembly of FIG. 9.

FIG. 9A is a top elevational view of the bistable latch assembly 900 of FIG. 9. As illustrated, the assembly 900 is generally elongated along one axis (denoted by line 9C-9C) while substantially circular around a second axis (denoted by line 9D-9D). This shape is generally dictated by or is an artifact of the interior construction of the device (described in greater detail below), and hence it will be appreciated that many other exterior shapes and/or internal configurations can be used consistent with the invention.

Figure 9B:
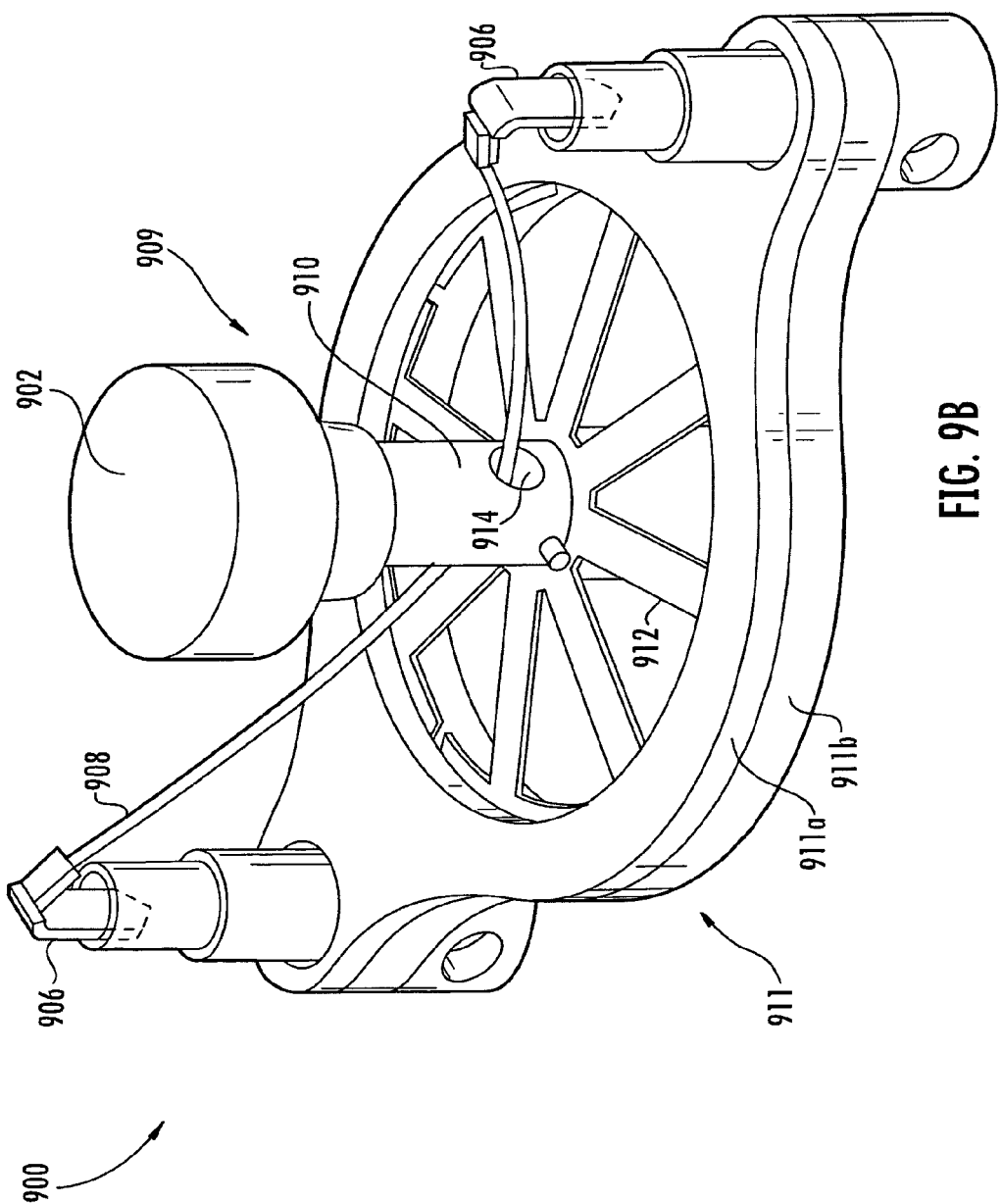
FIG. 9B illustrates a perspective view of the exemplary bistable latch assembly of FIG. 9 with the exterior housing removed.
Figure 9C:
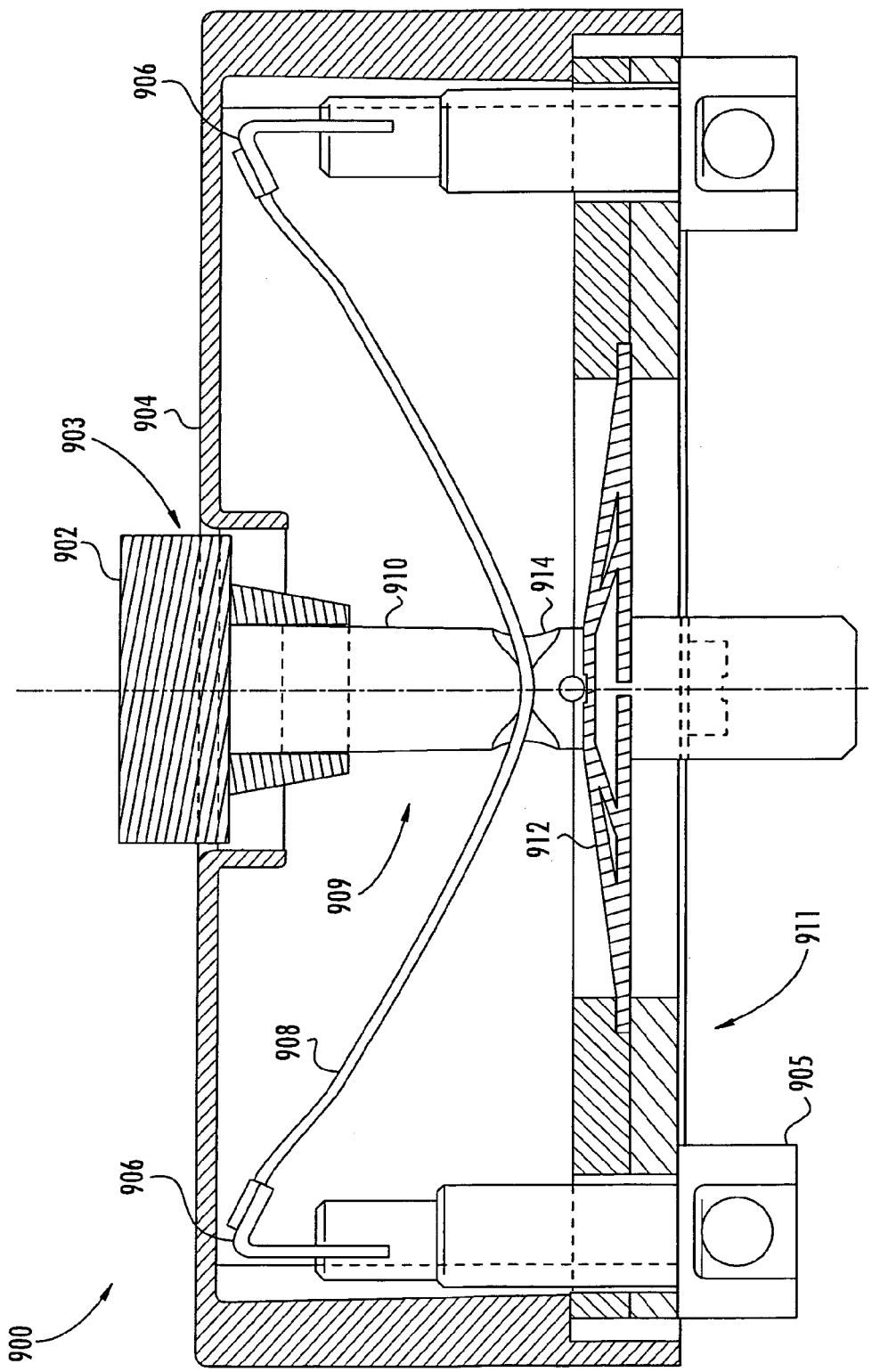
FIG. 9C illustrates a cross-sectional view of the exemplary bistable latch assembly of FIG. 9 taken along the line 9C-9C.
Figure 9D:
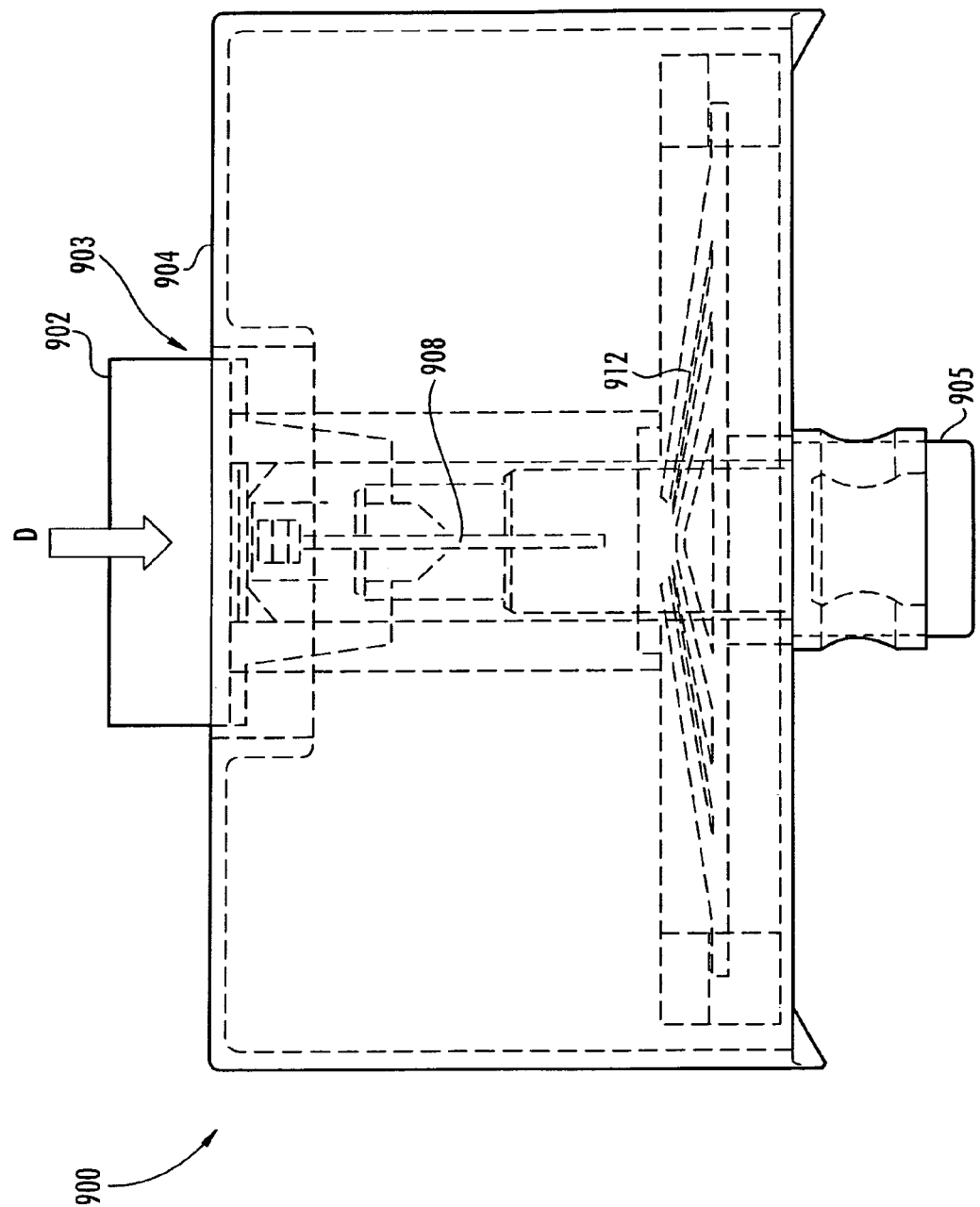
FIG. 9D illustrates a cross-sectional view of the exemplary bistable latch assembly of FIG. 9 taken along line 9D-9D.

Referring now to FIG. 9B, the internal components of the bistable latch assembly 900 are illustrated. In the embodiment of FIGS. 9-9D, the assembly 900 comprises a single alloy filament 908, a bistable diaphragm 912, held by a diaphragm retaining feature 911, a plunger 909, and two filament securing mechanisms 906. If desired, two (or more) filaments may be used instead of the unitary filament illustrated in FIG. 9B, although this unitary approach provides several benefits including simplicity, reduced number of securing mechanisms 906, and high reliability.

The filament securing mechanisms 906 secure two ends of the unitary filament 908 to the diaphragm retaining feature 911, such that the filament 908 generally crosses the length of the bistable diaphragm 912. This can be accomplished via soldering, welding, crimping (such as via methods described in co-owned and co-pending U.S. patent application Ser. No. 11/473,567, previously incorporated herein), adhesives, or the like. The foregoing crimping techniques have the distinct advantage of having extremely low give or "creep" with respect to the filament, which allows the filament to be shorter than it would otherwise need to be if techniques with more creep were utilized.

Moreover, these crimp techniques also advantageously allow for the crimping of very small diameter filaments, thereby economizing on filament material, and allowing the device to react faster than it would with a thicker filament. Specifically, a thinner diameter filament heats faster (whether by virtue of electrical current, ambient environment, or otherwise) than one of greater diameter, thereby causing a change in its length more rapidly.

In the illustrated embodiment, the bistable diaphragm 912 is generally circular; thus, the filament securing mechanisms 906 are placed across the diameter of the diaphragm 912 from each other, thereby causing the filament 908 to traverse the length of the bistable 912. The bistable 912 of the present embodiment is generally similar to the bistable diaphragm 108 discussed above with respect to FIGS. 1-8. Alternative bistable 912 shapes and placement of filament securing mechanisms 912 will be discussed in greater detail below.

The plunger 909 is generally comprised of a head 902 and body 910. As the filament 908 crosses the length of the bistable 912, it is fed through a cavity 914 in the plunger body 910. In one exemplary embodiment, the alloy filament 908 comprises SMA and is adapted to, upon activation, change physical shape. Activation of the SMA filament may be thermal activation (such as via a change in the environmental temperature) or application of a conductive, convective or radiative (e.g., IR) heat source, and/or an electrical current. In one exemplary embodiment, a 0.4 A current may be applied for an impulse duration of 0.075 sec. from a 3 Vt power supply to provide sufficient activation (heating) of the filament to cause it to change its physical shape a sufficient amount, although it will be appreciated that these values are merely illustrative of one embodiment.

During the impulse, the SMA wire shrinks, and moves the plunger 909 upward. In other words, the change of the physical shape of the filament 908 causes upward force to be applied to the plunger body 910. The plunger 909 is attached to the bistable diaphragm 912 (such as via welding, brazing, threaded fasteners, adhesives, or any number of other well known attachment techniques), and moves up approximately half of the stroke from the force imparted by the "shrinking" SMA wire 908. This produces a force on the bistable 912 which causes it to, similar to the diaphragms discussed above, change from a first to a second stable configuration. The plunger 909 is carried the remaining half stroke of via potential energy accumulated by the bistable element 912. Upon completion of the stroke, the plunger 909 will be displaced such that the head 902 will be received into the central aperture 903 of the assembly housing 904, and protrude above the plane of the housing 904 as demonstrated in FIG. 9.

The bistable diaphragm 912, as noted previously, is adapted to comprise two stable states and at least one meta-stable state; the two stable states coinciding with the substantially concave and substantially convex dispositions of the diaphragm, respectively.

The diaphragm 912 is held within the assembly 900 by a diaphragm retaining feature 911. The diaphragm retaining feature 911 maintains the general position of the diaphragm 912 with respect to the assembly 900 as the plunger 909 is displaced, while still permitting it to transition between the two stable states. In the illustrated embodiment, the diaphragm retaining feature 911 comprises an upper portion 911a and lower 911b portion adapted to at least partly surround the diaphragm 912. It is further appreciated that the bistable diaphragm 912 may comprise any number of various shapes and/or sizes including those discussed above with respect to FIGS. 3A-3I, those having one or more gaps or being substantially solid in nature. For example, the diaphragm 912 may, in one embodiment, be substantially rectangular in nature (such as that discussed above with respect to FIG. 4) thereby giving the assembly 900 a "slim" appearance. It is further noted that alteration to the size and/or shape of the bistable diaphragm 912 will necessitate alterations to the position of the filament securing mechanisms 906 and the diaphragm retaining feature 911. For example, if the bistable 912 is modified to be rectangular in shape, the securing mechanisms 906 may be placed near the center point of two opposing sides (either the long or short side) or alternatively, may be placed at opposite corners of the diaphragm 912. The diaphragm retaining feature 911 is also modified to generally match the shape of the diaphragm 912 (i.e., is made substantially rectangular) in this embodiment.

The filament 908 is disposed substantially above the diaphragm 912. The configuration of the filaments 908 is more clearly illustrated in the cross-sectional view illustrated in FIG. 9C. As illustrated, the filament 908 generally forms a V-type shape or "bow" so as to produce a strong pull on the diaphragm 912 when the filament 908 changes shape. As noted previously, the filament 908 is tensioned or at least partly preloaded so that, upon thermal activation, the filament 908 will contract thus pulling on the plunger 909 and forcing the bistable 912 to change states. Too much "slop" in the tension of the filament may cause the filament to assert insufficient force/throw on the plunger, thereby failing to cause the bistable to reach the meta-stable state (and subsequently transition to the other or actuated stable state).

As noted above, the diaphragm 912 is adapted to switch between a first and a second stable state. The filament 908 need only pull the diaphragm 912 through a meta-stable state and mechanical (potential) energy resident within the diaphragm 912 will cause the diaphragm 912 to transition to the new (stable) state.

The cross-sectional view of FIG. 9D illustrates the positioning of the plunger 909 in the "latched up" position. The latched up position occurs when the bistable 912 has assumed a second configuration due to the pull of the heated filament 908. The second configuration, as noted above, causes the head 902 of the plunger 909 to slide within the central aperture 903 of the housing 904 and extend upward, so as to be externally visible, or actuate a switch or other apparatus (if desired).

The diaphragm 912 will remain "latched up" until the assembly 900 is reloaded. In other words, the plunger 909 will remain protruding above the plane of the housing 904 until outside force is exerted on the plunger head 902. Reloading occurs when a mechanical force is exerted on the plunger head 902 inward toward the diaphragm 912 (direction given by arrow D), such as by an operator pressing down on the head with their finger, or an external mechanism. The downward or resetting force exerted causes the diaphragm 912 to assume a meta-stable state. As discussed above, only approximately one half of a full stroke is required to place the diaphragm 912 into a meta-stable state; then the potential energy of the diaphragm 912 will cause it to transition back to the first stable state (i.e., reloaded state). The application of force reloads the bistable diaphragm 912 and filament 908, and "latches down" the assembly 900. In other words, the plunger head 902 retracts within the assembly (i.e., no longer protrudes), and the bistable diaphragm 912 is held in the first stable configuration.

As in the embodiments described above, the bistable latching assembly 900 of FIGS. 9-9D is advantageously adapted to save energy. Specifically, (i) energy is not required to fully displace the diaphragm (i.e., the diaphragm merely requires power to get from a stable state to the meta-stable state) and (ii) no power is required to maintain the assembly 900 in the "latched up" or the "latched down" position.

As noted previously, the bistable diaphragm 912 of the bistable latching assembly 900 may be modified to comprise any number of shapes and sizes, such modification resulting in modification to the overall appearance of the assembly 900. For example, the use of a rectangular or square bistable 912 results in a generally rectangular or square assembly 900. It is further noted that other components of the assembly 900 may be modified to give a taller, thinner shape (such as modification to the plunger 909, etc.).

It will also be appreciated that a "slim" or reduced profile embodiment of the latch or sensor devices described previously herein may be made as well; e.g., similar to that of FIGS. 4-4b described previously herein. Such a reduced profile device has certain advantages over the other described embodiments in certain applications, including most notably smaller form factor and hence conservation of space.

Activation—

As indicated above, activation of the bistable latching assembly 900 requires the input of energy. In one embodiment, the electrical package discussed above with respect to FIG. 5B may be used to activate (heat) the filament 908, thereby causing it to change physical shape. Alternatively, other electrical packages may be used (such as that described in FIG. 5A). In another embodiment, the assembly 900 may comprise a thermal sensor wherein the filament 908 is activated when the environment temperature reaches a particular thermal point. The particular thermal point which will activate the filament 908 may be designed into the filament including consideration of parameters such as its thickness, whether single or multi-stranded, length, latency of environmental changes (i.e., how long between changes in temperature of the environment surrounding the assembly 900 and communication of this change to the filament sufficient to cause it to actuate, etc.).

Specific Implementations—

The bistable latching assembly 900 of the above configurations may, in one embodiment of the invention, be utilized in conjunction with any device which is electronically or electrically opened, such as a car trunk, car doors, car hood, fuel doors, doors requiring access codes or having other security means, etc. Further, the assembly 900 can be used any number and type of locking and/or unlocking applications, safety devices, etc. As noted above, in the foregoing applications, the assembly 900 will remain in a "latched down" configuration prior to activation. One or more control features may, when the assembly 900 is "latched down", assist in holding the door, hood or trunk closed and/or locked. Upon activation (either via the thermal characteristics of the environment, or via application of a current to the filament 908) of the assembly 900 the control feature(s) will release the door, hood or trunk thus causing the door, trunk or hood to be opened. In one embodiment, the activation of the assembly 900 is regulated by a user's push button, remote, switch, sensor, etc. (i.e., the user presses a button, etc. to cause the assembly 900 to be activated and the door, trunk or hood to be opened). When the user closes the door, trunk or hood the assembly 900 will be reloaded to its initial state.

In another embodiment, the bistable latching assembly 900 may be coupled to a mechanism for capturing and/or utilizing energy. For example, the plunger head 902 may be coupled to a spring. When the assembly 900 is "latched down" and the plunger head 902 lies within the assembly 900 (i.e., does not protrude from the plane of the housing 904), a spring coupled thereto (not shown) is able to maintain an extended position. As the assembly 900 is activation and the bistable diaphragm 912 changes states, the plunger head 902 will be displaced so that it protrudes from the assembly 900. The displacement of the plunger head 902 will, in turn, cause the spring to be contracted, thereby capturing the energy created by the movement of the plunger head 902. The converse may also be true if desired, depending on the particular application; i.e., the aforementioned spring may be "loaded" when the door, etc. is closed and the plunger similarly reloaded as previously described.

In yet another embodiment, the bistable latching assembly 900 may be coupled to an electrical switch. When the assembly 900 is not activated, the switch may be in a first state, and upon activation and displacement of the plunger head 902, the switch may be forced into a second state. For example, the assembly 900 may utilize a thermally activated filament 908 which is responsive to the environment temperature. At a certain temperature, the assembly 900 will be activated and displacement of the plunger 902 may cause a circuit to break thereby disabling a heater. Because the assembly 900 is activated by the environment temperature, a user will be unable to manually reset the assembly until the surrounding temperature no longer activates the assembly. In other words, a user will be unable to reconnect the circuit broken by the displaced plunger head 902 and operate the heater when the temperature remains too high.

In another embodiment, the bistable latching assembly 900 may be utilized as an electromagnetic switch or LVDT (linear variable differential transformer). According to this embodiment, the plunger head 902 is comprised of ferrous material. When the plunger head 902 is displaced, it slides relative to energized primary and secondary windings, thereby creating a differential magnetic field coupling (and voltage across each of the windings). The differential voltage can be used for any number of functions that will be recognizable by those of ordinary skill, such as for position indication, to trip a high temperature indicator or alarm, etc. In yet another embodiment, the assembly 900 can be used to activate a limit switch. As is well known in the electromechanical arts, limit switches are used to make and break electrical contacts and consequently electrical circuits. A limit switch may detect when the plunger head 902 has moved to a certain position. A certain operation may be triggered when the limit switch associated with the assembly 900 is tripped.

Manufacturing Methodology—

The bistable latching assembly 900 of the above embodiments may be manufactured by attaching the plunger 909 to the bistable diaphragm 912. This can be accomplished via any number of known mechanical attachment techniques including adhesives, crimping, threading, friction fit, riveting, welding, soldering, etc.

Next, the bistable diaphragm 912 is disposed within the diaphragm retaining feature 911 such that the diaphragm 912 is maintained in position while still able to change from one stable state to another.

Then, a first end of the filament 908 is secured to the retaining feature 911 via a filament securing mechanism 906 connected thereto. A second end of the filament 908 is then fed through a cavity or conduit on the plunger 909, and secured to a second securing mechanism 906 also connected to the retaining feature 911. Finally, a housing element 904 is disposed about the apparatus as needed; the housing provides a protective and/or environmental covering and is positioned to receive the head 902 of the plunger 909 in a central aperture thereof. In embodiments where the external or environmental temperature is important for actuation of the device 900, the housing can be made with one or more apertures (or even obviated) so as to allow for free flow of air (and/or incident electromagnetic/IP radiation).

Exemplary Bistable Diaphragm—

Figure 10:
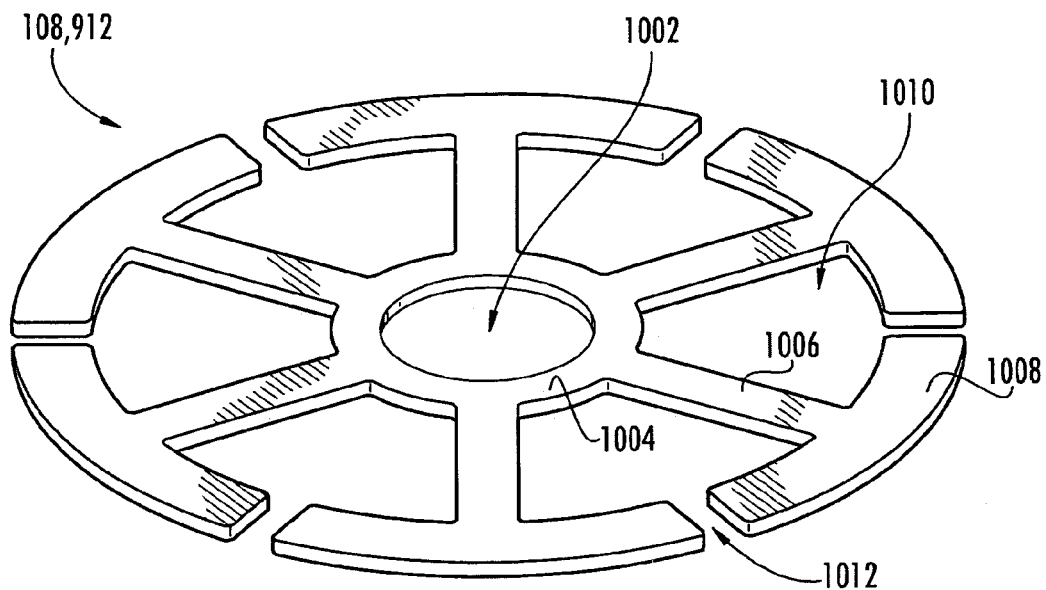
FIG. 10 illustrates a perspective view of one exemplary embodiment of the bistable diaphragm in accordance with the principles of the present invention, shown in a preloaded state.
Figure 10A:
FIG. 10A illustrates a side elevational view of the bistable diaphragm of FIG. 10, shown in an unloaded (flat) state.
Figure 10B:
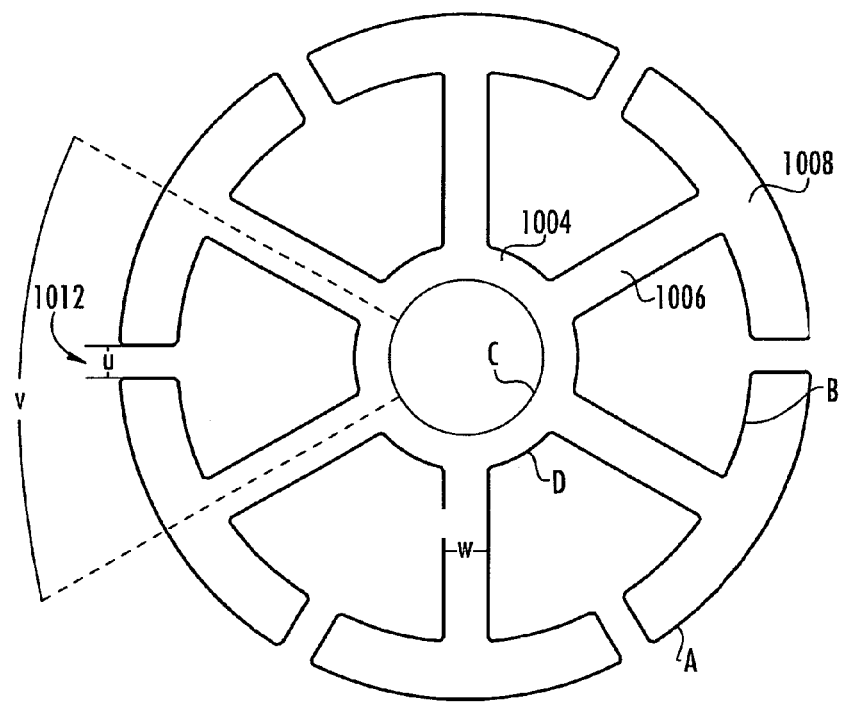
FIG. 10B illustrates a top elevational view of the bistable diaphragm of FIG. 10A.
Figure 10C:
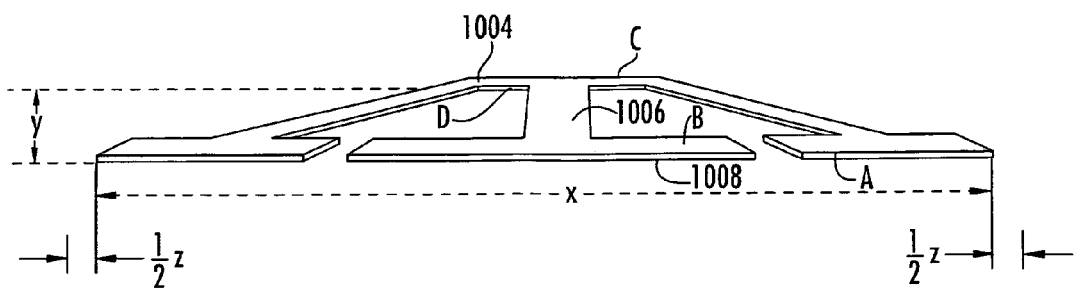
FIG. 10C illustrates a side elevational view of the exemplary bistable diaphragm of FIG. 10, shown in a preloaded state.
Figure 10D:
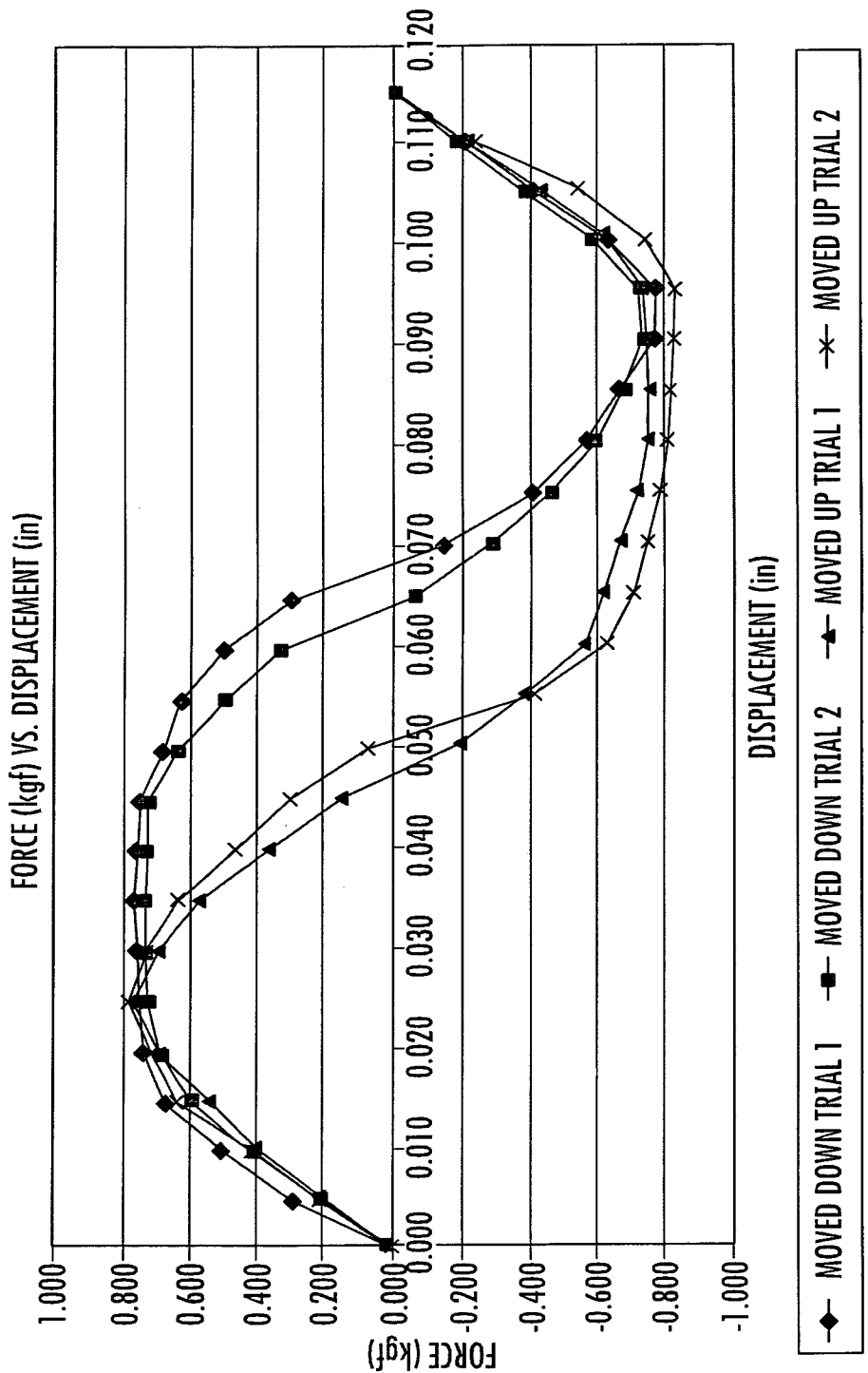
FIG. 10D is a graphical representation of the relationship between force exerted on the exemplary bistable diaphragm of FIG. 10, and the corresponding displacement of the center portion of the diaphragm.

An exemplary embodiment of a bistable diaphragm for use with e.g., the actuator assemblies of FIGS. 1-8, as well as for use in the bistable latch assembly of FIG. 9, is illustrated in FIGS. 10-10D.

As shown in FIG. 10, the bistable diaphragm 108, 912 generally comprises a unitary component having a distorted (i.e., non-planar when in a compressed or preloaded state) "disk" shape and made of a somewhat flexible metallic material. In one embodiment, the bistable diaphragm 108, 912 is formed of spring steel, however, it is appreciated that a wide range of materials may be used to manufacture the bistable, including inter cilia, carbon steel, stainless steel, phosphor bronze, beryllium copper, etc. The component (disk) is comprised of a central ring 1004 having, in its center, an opening or aperture 1002. In the embodiments of FIGS. 1-6, a central rod 106 is fed through the opening 1002, and a biasing element 112 is attached thereto. In the embodiments of FIGS. 9-9D, the body 910 of the plunger 909 is passed through the opening 1002. Yet other configurations may be used as well, the foregoing configurations being merely illustrative.

A plurality of radially disposed beams 1006 extend from the central ring 1004. The beams 1006 are spaced about the ring 1004 an equal distance apart from one another. In the illustrated embodiment, six beams 1006 are used; however, it will be appreciated that literally any number of beams 1006 (i.e., two or more) may be utilized consistent with this embodiment of the present invention.

It is further noted that: (i) non-equidistant spacing of the beams 1006 about the ring 1004; and/or (ii) non-uniform beam structures, may also be utilized. As one example, the beams may be "grouped" together into groups of two or more, the spacing between the beams of a group being different than the spacing between groups. Alternatively, the beams may be varied in size, shape, or geometry as a function of their radial or angular (azimuth) position, such as where they become thicker or thinner in width (w) or thickness (see e.g., dimension "d" on FIG. 10A), or alternate as a function of azimuth. Other configurations employing non-equidistant spacing and/or beam geometry will also be recognized by those of ordinary skill given the present disclosure.

As noted previously, the first end of each beam 1006 extends from the central ring 1004. At its other end, each beam 1006 terminates at and is attached to a corresponding arc segment 1008. The beams 1006 are generally formed so as to intersect the center of the arc segments 1008. The arc segments 1008, when taken together, form a punctuated circular periphery, which is concentric to the central ring 1004.

The arc segments 108 are punctuated or separated from one another, thus resulting in gaps 1012 formed in the outer circle of the diaphragm 108, 912. Furthermore, the individual beam 1006 and arc segment 1008 pairs are separated from one another so as to form apertures or channels 1010 between them. This feature allows each beam/segment combination to be individually articulated with respect to the others (and the central ring 1004).

Referring now to FIG. 10A, a side elevational view of the bistable apparatus 108, 912 of FIG. 10 is shown in its flattened or uncompressed (rest) state. It will be recognized however that, as described in greater detail subsequently herein, the bistable diaphragm of the present invention need not necessarily comprise a planar or flat shape in its relaxed or uncompressed state.

FIG. 10B is a top elevational view of the diaphragm 108, 912 of FIG. 10, shown unloaded (at rest). In the illustrated embodiment, the bistable diaphragm 108, 912 has six (6) beams 1006, each beam having a width (w). In one embodiment, the beams 1006 are 0.055 inches (1.40 mm) in width, although other values may readily be used. As noted previously, between each arc segment 108 a gap 1012 is formed having a dimension u. In one embodiment, the gaps 1012 between neighboring arcs 1008 are 0.034 inches (0.86 mm), yet other values can be substituted.

Each beam 1006 and arc 1008 pair is disposed about the central ring 1004 at a predetermined azimuth; the azimuth may be measured by e.g., a polar coordinate (e.g., 6, not shown) relative to a reference, or an angle (v) created between the center of first and second beams 1006. In one embodiment, the six beams 1006 are disposed about the central ring 1004 every 60° (at centerline), thereby comprising a full circle (360°). However, it is appreciated that an increase or decrease in the number of beams 1006 utilized (and other changes, such as use of non-uniform spacing, beam configuration, etc.) will necessitate smaller or larger angles of separation, respectively. For instance, where the beams 1006 are non-uniformly disposed about the central ring 1004, the angle of disposition between beams 1006 may be non-constant and/or greater or smaller than the exemplary measurements discussed above.

As is also illustrated in FIG. 10B, the outer edge (A) of the arc segments 1008 forms a larger circumference circle, and the inner edge (B) of the arc segments 1008 forms a smaller, concentric circle. In one embodiment, the radius of the larger, outer edge (A) is 0.3805 inches (9.66 mm), while the radius of the inner edge (B) is 0.320 inches (8.13 mm), as measured from the center of the aperture 1002. The same is also true for circles formed by the inner (C) and outer (D) edges of the central ring 1004. In one exemplary embodiment, the diameter of inner circle (i.e., the circle forming the central opening 1002) is 0.175 inches (4.44 mm) (radius=0.0875 in. (2.22 mm)), while the radius of the circle formed by the outer edge (D) of the central ring 1004 is 0.1255 inches (3.19 mm).

As illustrated in FIG. 10C, the exemplary bistable diaphragm 108, 912 in its sprung or preloaded state comprises generally a truncated cone (or frustum) having a circular base and a circular apex (see FIG. 10B). Accordingly, the diameter of the base (i.e., the circle formed by the outer edge (A) of the arc segments 1008) is significantly larger than the diameter of the apex (i.e., the circle formed by the outer edge (D), of the central ring 1004). The diameter of the base (x) is representative of the diameter of the circle formed by the outer edge (A) of the arc segments 1008.

The aforementioned "preload" of the diaphragm is accomplished in one embodiment by constraining the outer circumference (A) of the arc segments within a substantially circular channel or frame having a diameter somewhat smaller than that of the diaphragm in its unsprung state (e.g., 0.010 in. (0.25 mm) smaller, thereby achieving the preloaded overall diameter (x) of approximately 0.75 in. (19.05 mm) shown in FIG. 10C). This in effect causes the diaphragm to "bulge" outward at its center (apex) in one direction or the other relative to the centerline plane, corresponding to the two stable states respectively.

Specifically, the illustrated embodiment of the bistable diaphragm 108, 912 comprises two stable states, and one meta-stable state, when the device is preloaded as just described. In one stable state, the diaphragm 108, 912 is convex or protruding upwards (shown in the illustrated embodiment). In another stable state, the diaphragm 108, 912 is concave or protruding downwards (not shown). In the illustrated embodiment, the apex protrudes upwards a distance (y) above the plane of the base (here defined as the plane containing the lowest or outer edge of the arc segments 1008); e.g., 0.056 inches (1.42 mm) above the plane of this base.

The shape of the illustrated embodiment of the diaphragm 108, 912 is such that after a force is applied to a diaphragm while in a first stable and preloaded state (e.g., at its apex, such as via a rod or structure disposed within the aperture 1002 and coupled to the central ring), and the meta-stable state is reached and just exceeded, the diaphragm 108, 912 will transition into the second stable state with no additional force applied. This property has, as previously discussed, significant advantages in terms of energy or power savings. FIG. 10D gives a graphical representation of the relationship between the application of force onto the diaphragm 108, 912 and the displacement of the apex (towards and away from the plane, of the base); i.e., the displacement of the apex between the two stable states.

As illustrated in FIG. 10D, when force is applied to the bistable diaphragm 108, 912 in a first stable state, the diaphragm is deflected proportionally until the amount of deflection reaches approximately 0.025 inches (0.64 mm) (the meta-stable state). After the diaphragm 108, 912 has been deflected 0.025 inches (0.64 mm), the force required for continued deflection remains effectively constant until the diaphragm 108, 912 approaches the "snap" position, i.e., the position where the diaphragm 108, 912 changes from the meta-stable state to the second stable state (at about 0.065 inches (1.65 mm) of travel), during which no further force need be applied. The diaphragm apex then settles into the second stable state (at about 0.115 in. (2.92 mm) of displacement). The aforementioned snap is caused by, inter alia, the mechanical forces created within the disk material when the force is applied (i.e., the work energy of the applied force is converted to potential energy stored within the material structure of the disk when in the meta-stable state, and then reconverted to work when the diaphragm exits the meta-stable state).

It is noted that in theory, the diaphragm 108, 912 of the illustrated embodiment should change from meta-stable state to the second stable state when the diaphragm 108, 912 has been deflected more than 0.056 inches (1.42 mm). However, in practice it is found that about 0.009 inches (0.23 mm) of additional deflection are needed to achieve the transition. The diaphragm 108, 912 is able to develop the force profile, shown in FIG. 10D (up to 0.750 kilograms force (kgf) in this particular case). The bistable diaphragm 108, 912 exerts the hysteresis behavior between two stable positions (the curves "Moved Down" and "Moved Up").

As indicated by the "inverted" data traces given in FIG. 10D, an opposite force is required to transition the diaphragm 108, 912 back from the second stable state to the first (e.g., initial position). This is effectively symmetric to the first ("normal") profiles, but in the opposite direction. It is noted that, in an alternative embodiment, a bistable diaphragm 108, 912 may not demonstrate a first profiles for the transition from the first to second state and a second (i.e., not symmetric) profile for the transition from the second back to the first state. For example, this asymmetric behavior may cause different magnitude of forces or/and deflection when "Moved Down" and/or when "Moved Up". Asymmetric profiles may result from the use of bistable diaphragm which are not symmetrical in shape, or in instances where the bistable is constrained inside the base or by the symmetrical spokes 1006. It is further noted that the graph of FIG. 10D is merely representative of the displacement/force characteristics of the illustrated embodiment of the diaphragm, and that alternative design configurations of the beams will create the different force/displacement profiles. For example, the use of thicker material may result in a profile which has greater force "peaks" in both positive and negative displacement directions.

As previously referenced, the illustrated embodiment of the bistable diaphragm is manufactured as a single flat structure (which remains flat in its relaxed or unconstrained state). The flat structure is then inserted into a substantially circular containment apparatus. The containment apparatus may comprise for example the housing 102, 904, or the diaphragm retaining elements 110, 911. As indicated in FIG. 10C, the diameter of the diaphragm 108, 912 is displaced a distance (z; see FIG. 10C) when the diaphragm is disposed within the confining shape; this displacement results in the convex or concave overall shape of the diaphragm 108, 912.

It is appreciated that in an alternate embodiment, the diaphragm 108, 912 may be formed in the frustrum shape at manufacture (i.e., when not preloaded), and the size of the containment apparatus may be substantially equal to the diameter of the diaphragm 108, 912 (i.e., the containment apparatus may not confine or restrain the diaphragm into a smaller diameter as discussed above).

Such shapes may also comprise a "uni-stable" device; i.e., one where there is only a single stable shape, and the meta-stable state must be maintained by the continued application of force. For instance, the aforementioned filament or SMA wire could be used to maintain a given force on the diaphragm (via e.g., the central rod or plunger) while the filament was heated, but as the heating subsided, the force would be relaxed and the diaphragm would return of its own accord (via the potential energy stored in the diaphragm material in the meta-stable state) to the single stable state. This approach obviates the need to mechanically reset the plunger/indicator using an external force, as previously described herein.

As illustrated above with respect to the embodiments of FIGS. 1-6 and 9, a rod 106 or plunger 902 is inserted into the central aperture 1002 of the diaphragm. The rod 106 or plunger 902 is actuated generally perpendicular to the planar base of the diaphragm 108, 912 by the SMA wire(s), causing the apex (central ring 1004) of the diaphragm 108, 912 to push out towards the confining perimeter (i.e., the walls of the containment apparatus). In other words, a pushing or pulling force is applied to the diaphragm 108, 912 via the rod 106 or plunger 902. The force causes the apex (central ring 1004) to be displaced. The circular shape of the diaphragm 108, 912 of the illustrated embodiment advantageously keeps the rod 106 or plunger 902 in alignment with the central opening 1002 and, any other channels provided for the rod 106 or plunger 902. As shown previously in FIG. 10D, the circular shape also provides a particular force profile for the diaphragm 108, 912 through much of its deflection. The outer ring of the diaphragm 108, 912 (dimension A formed by the arc segments 1008) is separated on the diameter to allow the diaphragm 108, 912 to push against the containment apparatus to control the force achieved. A single-beam diaphragm (e.g., a rectangular diaphragm, not shown) may also provide for the pushing forces discussed above; however, such a rectangular diaphragm does not provide stabilization and alignment (e.g., centralization) of the rod 106 or plunger 902.

Filament Securing Mechanisms—

Figure 11:
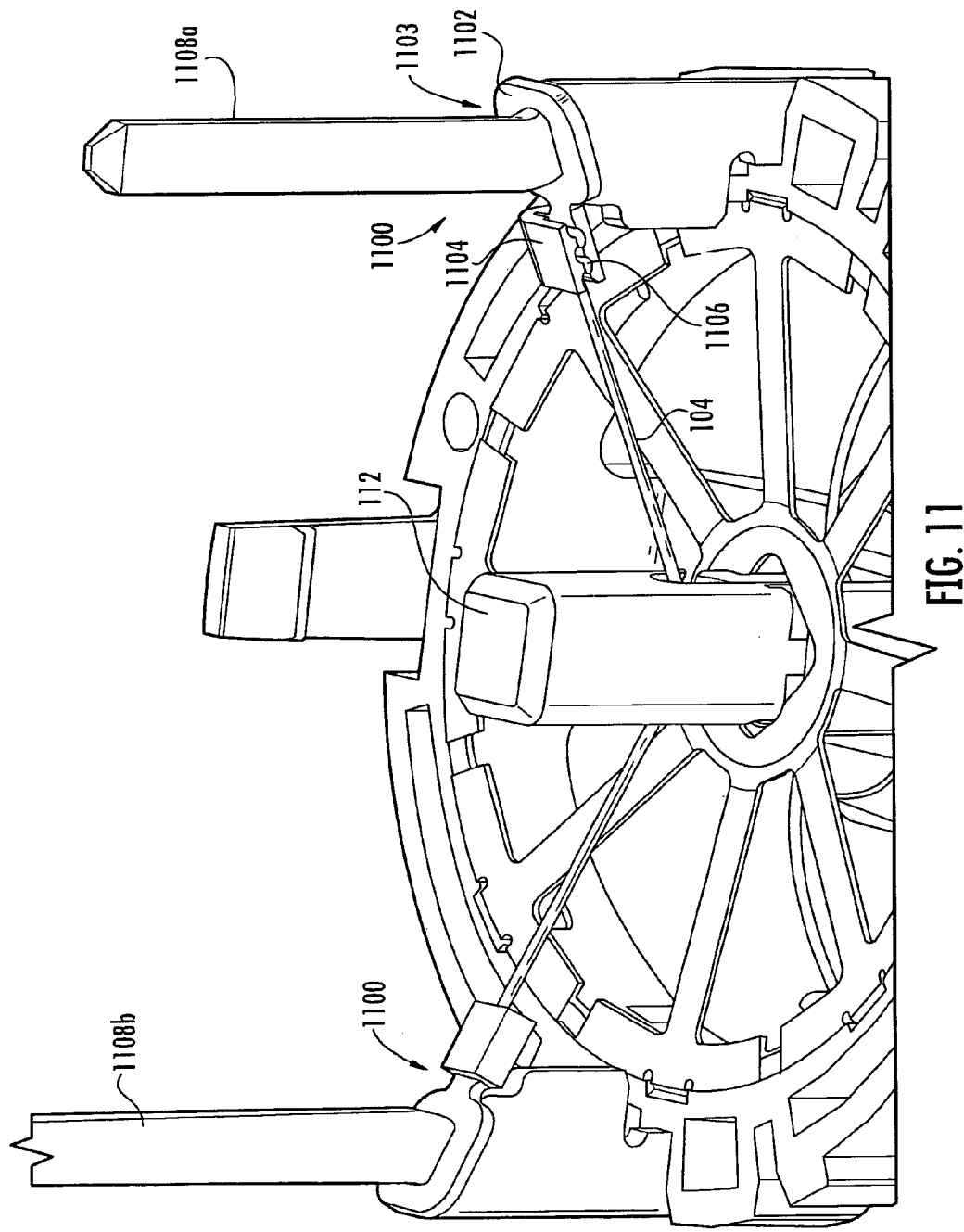
FIG. 11 illustrates a perspective view of an exemplary bistable latch assembly utilizing ring assembly connectors.

In yet another embodiment, as illustrated in FIG. 11, the securing mechanism 114, 906 used to secure the alloy filaments 104, 908 to the apparatus may comprise an element having an aperture formed therein 1100. In the illustrated embodiment, this element 1100 comprises a substantially ring-shaped portion 1102. The ring 1102 is generally formed by a frame having the aperture 1103 formed therein. The frame as shown is substantially curved, e.g., rounded; however, it is appreciated that the element 1100 may comprise any closed shape. For example, the element 1100 is, in certain embodiments, generally triangular, circular, elliptical, or square, etc. in shape, depending on the needs of the particular application.

In the illustrated embodiment, the general shape of the ring 1102 and size of the aperture formed therein correlate to the shape and size of the conductive posts 1108a, 1108b over which the rings are inserted. For example, in the illustrated embodiment, the posts 1108a, 1108b have a generally rectangular cross sectional profile (not shown), thus the aperture of the ring assembly 1100 has a corresponding generally rectangular shape. However, it is appreciated that the posts 1108a, 1108b (and aperture of the ring assembly 1100) may comprise literally any cross-sectional shape. The conductive posts 1108a, 1108b of FIG. 11 can be adapted to be inserted into an electrical power supply or otherwise conduct electrical current if desired. Because the illustrated posts 1108a, 1108b are formed of a conductive material (such as, inter glia, metals such as copper or aluminum, metal alloys, etc.), they are particularly adapted to pass the electric current, as will be discussed herein below.

The ring terminal assembly 1100 fluffier comprises a filament retaining portion 1104. The filament retaining portion 1104 is configured to extend away from the ring 1102 aperture. The filament retaining portion 1104 utilizes one or more mechanisms to accommodate at least one filament 104, 908 (e.g., formed from SMA). In the illustrated embodiment, the retaining portion 1104 accommodates the filaments 104, 908 by creating a filament 104, 908 receiving cavity 1106. The cavity 1106 is formed by folding a portion of the retaining portion 1104 back over itself. A filament 104, 908 is then received within the cavity 1106. In the illustrated embodiment, the filament retaining portion 1104 is generally pliable such that the size of the cavity 1106 may be adjusted to easily fit the filament 104, 908. Once the filament 104, 908 is received within the cavity 1106, the fold of the retaining portion 1104 may be firmly pressed, thereby securing the filament 104, 908 therein. It will be appreciated that while FIG. 11 shows a generalized filament retaining structure, this portion 1104 may comprise a crimp of the type(s) previously described herein if desired; e.g., one adapted to create a substantially serpentine channel (cavity 1106), and/or which is particularly adapted for use with SMA filaments.

The cavity 1106 may be adapted to comprise a grooved or otherwise textured surface ensuring sufficient electrical contact of the ring assembly 1100 with the filament 104, 908 if required (as well as sufficient mechanical strength and advantageous mitigation of any "creep" of the filament within the cavity 1106). The firm contact between the cavity 1106 of the ring terminal and the filament 104, 908 enables any electrical current passed through the conductive posts 1108a, 1108b to farther pass through the filaments 104, 908. Thus, if a voltage difference is applied between the two posts 1108a, 1108b, the internal resistance of the filament 104, 908 causes the filament 104, 908 to heat up and change its length as previously described herein.

In one embodiment, the voltage difference is employed by applying an electric potential to only one post 1108a, while the other post 1108b provides grounding. In an alternative embodiment, both posts 1108a, 1108b may be adapted to have electrical potential applied thereto and the biasing element 112 (or plunger body 910) acts as the ground. Since the filament 104, 908 is always in tension there is always a physical connection (contact) between the filament 104, 908 and the posts 1108a, 1108b providing electrical current. The ring terminal assembly 1100 eliminates the need for a spring contact or a permanent attachment.

As discussed previously, when heat energy is applied to the filament 104, 908, it substantially changes its geometry, which subsequently causes a force to be applied to the biasing element 112 (or plunger body 910). The force then causes the diaphragm 108 to switch from a first stable state to a second stable state.

It is appreciated that, in embodiments where more than one filament 104, 908 is utilized, each filament 104, 908 (i.e., the upper and lower filaments in FIG. 11) may be attached via the aforementioned ring terminal assemblies 1100 and respective conductive posts 1108a, 1108b. Accordingly, a current may be applied to one of the lower or upper filament 104, 908 at any one time. For example, when current is applied to the posts 1108a, 1108b associated with the upper filament 104, 908, no current will be applied to the posts associated with the lower filament.

The aforementioned embodiments advantageously reduce the complexity and costs of the apparatus by eliminating the need for a permanent or other filament retention feature as well as providing an efficient mechanism for optionally applying heat energy to the filaments.

Figure 11A:
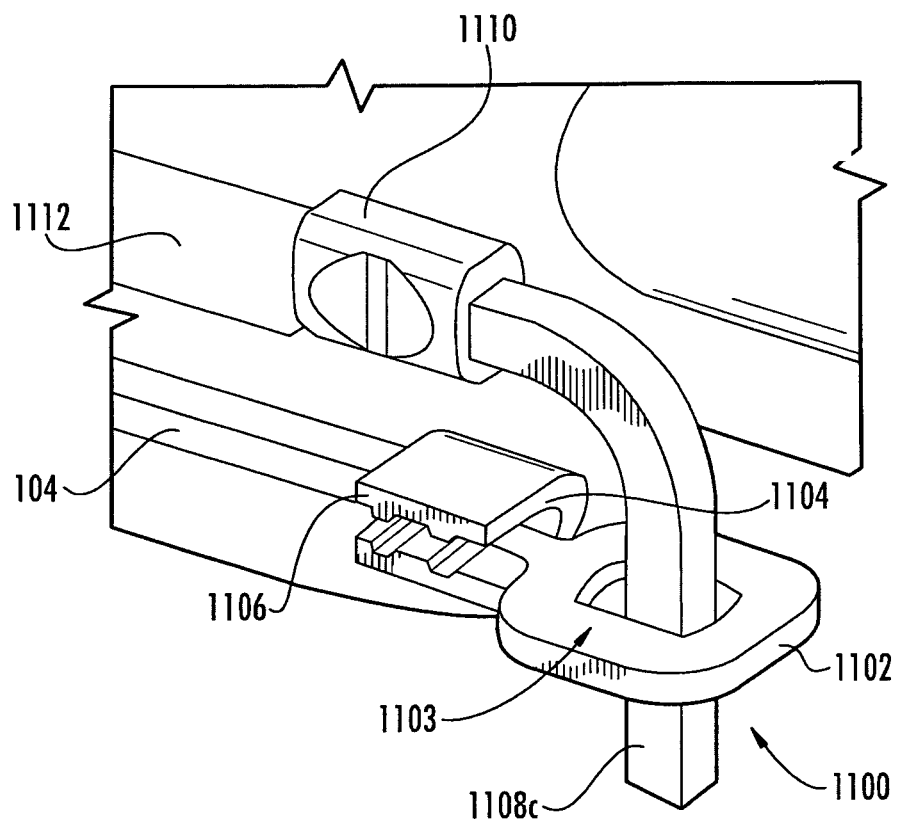
FIG. 11A illustrates a perspective view of another exemplary ring assembly for use with the bistable latch of the present invention.

Referring now to FIG. 11A, another embodiment of an exemplary ring terminal assembly 1100A is shown. The ring assembly 1100 of this embodiment comprises a cavity 1106 for receiving and/or crimping a filament 104, 901. The ring portion 1102 is disposed on (and thus in electrical contact with) the conductive post 1108c. Although only a single conductive post 1108c is illustrated, it will be appreciated that an exemplary assembly 100 may utilize more than one such post.

The curved shape of the conductive post 1108c in the illustrated embodiment enables the ring assembly 1100 to be used in various shaped assembly 100 including, e.g., the assembly illustrated in FIG. 2 discussed above. Also illustrated in FIG. 11A, the ring assembly 1100 utilizes a screw-in terminal 1110 for receiving a power supplying barrel wire 1112.

It can be appreciated that while certain aspects of the invention have been described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An actuator, comprising:
   a diaphragm element, said diaphragm element comprising two substantially stable configurations; and
   at least first and second alloy filaments adapted to exert force on first and second sides of said diaphragm, respectively, via the use of a biasing element that is coupled to both the diaphragm element and the at least first and second alloy filaments;
   wherein said first and second filaments are arranged to alternatively be placed under tension or relaxed when said diaphragm changes state from a first of said configurations to a second of said configurations; and
   wherein the biasing element is further configured to actuate a rod portion that opens or closes a valve depending on the substantially stable configuration chosen.

2. The actuator of claim 1, wherein said first filament is tensioned and said second filament is relaxed simultaneously when said diaphragm is in said first stable configuration.

3. The actuator of claim 2, wherein current applied to said first tensioned filament will place said diaphragm in said second stable configuration.

4. The actuator of claim 3, wherein said two substantially stable configurations require no application of power in order to remain in individual ones of said two substantially stable configurations.

5. The actuator of claim 2, wherein said second filament is tensioned and said first filament is relaxed simultaneously when said diaphragm is in said second stable configuration.

6. The actuator of claim 1, wherein said diaphragm element comprises a substantially circular shape that is placed under a hoop stress so as to provide said two substantially stable configurations.

7. The actuator of claim 6, wherein said substantially circular shape comprises a plurality of spoke-like arms, at least a portion of which extend in a radial direction from a center portion of said circular shape.

8. The actuator of claim 1, further comprising a substantially portable power source.

9. The actuator of claim 8, wherein said substantially portable power source comprises a plurality of power cells disposed in electrical parallel with one another.

10. The actuator of claim 9, wherein said first and second alloy filaments are configured so that as few as one of said plurality of power cells in said electrical parallel disposition is sufficient to operate said actuator.

* * * * *